United States Patent
Kim et al.

(10) Patent No.: US 12,015,577 B2
(45) Date of Patent: Jun. 18, 2024

(54) BANDWIDTH PART SWITCHING TECHNIQUES IN WIRELESS COMMUNICATIONS

(71) Applicant: QUALCOMM Incorporated, San Diego, CA (US)

(72) Inventors: Yuchul Kim, San Diego, CA (US); Hwan Joon Kwon, San Diego, CA (US); Krishna Kiran Mukkavilli, San Diego, CA (US); Jay Kumar Sundararajan, San Diego, CA (US); Huilin Xu, Temecula, CA (US); Jing Lei, San Diego, CA (US); Peter Gaal, San Diego, CA (US); Wanshi Chen, San Diego, CA (US); Yeliz Tokgoz, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 17/403,675

(22) Filed: Aug. 16, 2021

(65) Prior Publication Data

US 2022/0052821 A1  Feb. 17, 2022

Related U.S. Application Data

(60) Provisional application No. 63/066,769, filed on Aug. 17, 2020.

(51) Int. Cl.
*H04L 5/00* (2006.01)
*H04L 1/1812* (2023.01)
(Continued)

(52) U.S. Cl.
CPC .......... *H04L 5/0053* (2013.01); *H04L 1/1819* (2013.01); *H04W 72/0446* (2013.01); *H04W 72/23* (2023.01)

(58) Field of Classification Search
CPC ..... H04L 5/0053; H04L 1/1819; H04L 5/001; H04L 5/0098; H04L 5/009;
(Continued)

(56) References Cited

U.S. PATENT DOCUMENTS

2013/0083753 A1* 4/2013 Lee .................. H04L 1/1858
370/329
2018/0183551 A1* 6/2018 Chou ................ H04W 74/006
(Continued)

FOREIGN PATENT DOCUMENTS

WO  WO-2021030217 A1  2/2021

OTHER PUBLICATIONS

CMCC: "Discussion on UE Power Saving Schemes with Adaption to UE Traffic", 3GPP TSG RAN WG1 #96, 3GPP Draft, R1-1903344, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 22, 2019 (Feb. 22, 2019), 14 Pages, XP051601021, Retrieved from the Internet: URL: http://www.3gpp.org/ftp/tsg%5Fran/WG1%5FRL1/TSGR1%5F96/Docs/R1%2D1903344%2Ezip [retrieved on Feb. 22, 2019] sections 3 and 4, section 1, "Introduction" section 4. "BWP configuration for video streaming", paragraph [0004], figures 10-12.
(Continued)

*Primary Examiner* — Charles C Jiang
*Assistant Examiner* — Debebe A Asefa
(74) *Attorney, Agent, or Firm* — Holland & Hart LLP

(57) ABSTRACT

Methods, systems, and devices for wireless communications are described in which a wideband bandwidth part (BWP)
(Continued)

may be used for periodic communications bursts, and a user equipment (UE) may switch to a narrowband BWP between the communications bursts, which may provide reduced power consumption and reduced processing overhead at the UE. An end of burst indicator may be provided with the wideband BWP communications that indicates a timing for switching from the wideband BWP to the narrowband BWP. The end of burst indicator may be provided prior to a last downlink shared channel communication of the communications burst, and the UE may switch to the narrowband BWP upon completion of the last downlink shared channel communication. The UE may switch from the narrowband BWP to the wideband BWP for a subsequent communications burst autonomously or based on an explicit indication.

30 Claims, 25 Drawing Sheets

(51) Int. Cl.
*H04W 72/0446* (2023.01)
*H04W 72/23* (2023.01)

(58) Field of Classification Search
CPC . H04W 72/0446; H04W 72/23; H04W 36/06; H04W 72/0453; Y02D 30/70
See application file for complete search history.

(56) References Cited

U.S. PATENT DOCUMENTS

| | | | |
|---|---|---|---|
| 2019/0044811 A1* | 2/2019 | Miao | H04L 5/0098 |
| 2019/0261406 A1* | 8/2019 | Kim | H04W 76/27 |
| 2020/0280971 A1 | 9/2020 | Moon et al. | |
| 2021/0051631 A1* | 2/2021 | Deogun | H04L 5/0098 |

OTHER PUBLICATIONS

Mediatek Inc: "Remaining Details on Bandwidth Part Operation in NR", 3GPP Draft, 3GPP TSG RAN WG1 Meeting NR#3, R1-1716202_Remaining Details on Bandwidth part Operation in NR, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339660, 9 Pages, Retrieved from the Internet: URL:http://www.3gpp.org/ftp/Meetings_3GPP_SYNC/RAN1/Docs/ [retrieved on Sep. 17, 2017] section 2.4, p. 4-p. 5, paragraph [02.4].

Qualcomm Incorporated: "Remaining Issues on BWP", 3GPP TSG RAN WG1 Meeting #92, 3GPP Draft; R1-1802844, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 26, 2018-Mar. 2, 2018, Feb. 17, 2018 (Feb. 17, 2018), pp. 1-24, XP051398257, Retrieved from the Internet: URL: http://www.3gpp.org/ftp/tsg_ran/WG1_RL1/TSGR1_92/Docs [retrieved on Feb. 17, 2018], Sections 1-3, paragraph [2.1.2], figures 1-3.

* cited by examiner

BANDWIDTH PART SWITCHING TECHNIQUES IN WIRELESS COMMUNICATIONS

CROSS REFERENCE

The present application for patent claims the benefit of U.S. Provisional Patent Application No. 63/066,769 by KIM et al., entitled "BANDWIDTH PART SWITCHING TECHNIQUES IN WIRELESS COMMUNICATIONS," filed Aug. 17, 2020, assigned to the assignee hereof, and expressly incorporated by reference herein.

TECHNICAL FIELD

The following relates to wireless communications, including bandwidth part switching techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may be in communications in which relatively large amounts of data are communicated at regular intervals, resulting in periodic bursts of communications (which may be referred to as bursty communications). For example, a UE running a virtual reality (VR) or augmented reality (AR) application (which may be referred to as XR applications) may have data bursts that correspond to frame rates of the data that is communicated with the UE. Efficient techniques for supporting such communications may be desirable for UE and network efficiency and for positive user experiences.

SUMMARY

The described techniques relate to improved methods, systems, devices, and apparatuses that support bandwidth part switching techniques in wireless communications. Various aspects provide techniques in which a wideband bandwidth part (BWP) may be used for periodic communications bursts, and a user equipment (UE) may switch to a narrowband BWP between the communications bursts, which may provide reduced power consumption and reduced processing overhead at the UE between the wideband BWP communications bursts. In some cases, an end of burst indicator may be provided with the wideband BWP communications that indicates a timing for switching from the wideband BWP to the narrowband BWP. In some cases, the end of burst indicator may be provided prior to a last downlink shared channel communication of the communications burst, and the UE may switch to the narrowband BWP upon completion of the last downlink shared channel communication. In some cases, the UE may switch to the narrowband BWP based on a timing between the last downlink shared channel communication of the communications burst and a feedback communication (e.g., a hybrid automatic repeat request (HARQ) feedback communication), based on a timing between the last downlink shared channel communication of the communications burst and a retransmission of a portion of the communication burst, or any combinations thereof. In some cases, the UE may switch from the narrowband BWP to the wideband BWP (or to a different wideband BWP) for a subsequent communications burst autonomously or based on an explicit indication.

A method of wireless communication at a UE is described. The method may include receiving, from a base station, wideband communications over a first bandwidth part of a total bandwidth available for communications between the base station and the UE, identifying a last slot of the wideband communications based on an end of burst indicator provided with control information from the base station, where the last slot of the wideband communications is identified prior to reception of the last slot of the wideband communications, and switching, based on the identifying, from the first bandwidth part to a second bandwidth part subsequent to the last slot of the wideband communications, where the second bandwidth part spans a narrower portion of the total bandwidth than the first bandwidth part.

An apparatus for wireless communication at a UE is described. The apparatus may include at least one processor, memory coupled (e.g., operatively, communicatively, functionally, electronically, or electrically) with the at least one processor, and instructions stored in the memory. The instructions may be executable by the at least one processor to cause the apparatus to receive, from a base station, wideband communications over a first bandwidth part of a total bandwidth available for communications between the base station and the UE, identify a last slot of the wideband communications based on an end of burst indicator provided with control information from the base station, where the last slot of the wideband communications is identified prior to reception of the last slot of the wideband communications, and switch, based on the identifying, from the first bandwidth part to a second bandwidth part subsequent to the last slot of the wideband communications, where the second bandwidth part spans a narrower portion of the total bandwidth than the first bandwidth part.

Another apparatus for wireless communication at a UE is described. The apparatus may include means for receiving, from a base station, wideband communications over a first bandwidth part of a total bandwidth available for communications between the base station and the UE, identifying a last slot of the wideband communications based on an end of burst indicator provided with control information from the base station, where the last slot of the wideband communications is identified prior to reception of the last slot of the wideband communications, and switching, based on the identifying, from the first bandwidth part to a second bandwidth part subsequent to the last slot of the wideband communications, where the second bandwidth part spans a narrower portion of the total bandwidth than the first bandwidth part.

A non-transitory computer-readable medium storing code for wireless communication at a UE is described. The code may include instructions executable by at least one processor to receive, from a base station, wideband communications over a first bandwidth part of a total bandwidth available for communications between the base station and the UE, identify a last slot of the wideband communications based on an end of burst indicator provided with control information from the base station, where the last slot of the wideband communications is identified prior to reception of the last slot of the wideband communications, and switch, based on the identifying, from the first bandwidth part to a second bandwidth part subsequent to the last slot of the wideband communications, where the second bandwidth part spans a narrower portion of the total bandwidth than the first bandwidth part.

In some examples of the method, apparatuses, and non-transitory computer-readable medium described herein, the identifying may include operations, features, means, or instructions for receiving, from the base station after an initial transmission of the wideband communications, layer-one signaling that includes the end of burst indicator. In some examples of the method, apparatuses, and non-transitory computer-readable medium described herein, the layer-one signaling includes a flag in a scheduling DCI transmission that triggers the switching to the second bandwidth part. In some examples of the method, apparatuses, and non-transitory computer-readable medium described herein, the switching to the second bandwidth part may be performed in a next slot following the last slot of the wideband communications.

Some examples of the method, apparatuses, and non-transitory computer-readable medium described herein may further include operations, features, means, or instructions for determining feedback that indicates successful or unsuccessful receipt of the wideband communications, and transmitting the feedback to the base station using the second bandwidth part. Some examples of the method, apparatuses, and non-transitory computer-readable medium described herein may further include operations, features, means, or instructions for determining feedback that indicates successful or unsuccessful receipt of the wideband communications, and transmitting the feedback to the base station using the first bandwidth part, and where the switching to the second bandwidth part may be performed after the feedback is transmitted to the base station.

Some examples of the method, apparatuses, and non-transitory computer-readable medium described herein may further include operations, features, means, or instructions for identifying, based on the control information, a timing for switching from the second bandwidth part to a third bandwidth part to receive further wideband communications from the base station, switching, based on the identifying the timing, to the third bandwidth part, where the third bandwidth part may have a same bandwidth as the first bandwidth part or a different bandwidth than the first bandwidth part, and receiving, from the base station, further wideband communications over the third bandwidth part. In some examples of the method, apparatuses, and non-transitory computer-readable medium described herein, the UE autonomously switches to the third bandwidth part based on one or more of a configured periodicity of wideband communications, an indication in the control information, or any combinations thereof. In some examples of the method, apparatuses, and non-transitory computer-readable medium described herein, the configured periodicity of wideband communications provides bandwidth part switching times and may be provided by one or more of RRC signaling that indicates a periodicity and an offset for bandwidth part switching, a DRX On-duration start time, information provided with the end of burst indicator, or any combinations thereof.

Some examples of the method, apparatuses, and non-transitory computer-readable medium described herein may further include operations, features, means, or instructions for determining that a retransmission of at least a portion of the wideband communications may be to be received from the base station, switching from the second bandwidth part to the first bandwidth part based on the determining, receiving the retransmission of at least the portion of the wideband communications, and switching from the first bandwidth part to the second bandwidth part subsequent to the retransmission of at least the portion of the wideband communications.

In some examples of the method, apparatuses, and non-transitory computer-readable medium described herein, a time for the switching from the first bandwidth part to the second bandwidth part may be based on one or more of a first time duration between the last slot of the wideband communications and a feedback transmission associated with the wideband communications, a second time duration between the feedback transmission and one or more retransmissions associated with the feedback transmission, or any combinations thereof. In some examples of the method, apparatuses, and non-transitory computer-readable medium described herein, the first bandwidth part may be maintained at the UE based on one or more of the first time duration or the second time duration being less than a time threshold value. In some examples of the method, apparatuses, and non-transitory computer-readable medium described herein, the time threshold value may be based on a bandwidth part switching time associated with the UE.

A method of wireless communication at a base station is described. The method may include transmitting, to a UE, wideband communications over a first bandwidth part of a total bandwidth available for communications between the base station and the UE, transmitting an end of burst indicator to the UE that identifies a last slot of the wideband communications, where the end of burst indicator is provided prior to transmission of the last slot of the wideband communications, and switching, based on the end of burst indicator, UE communications from the first bandwidth part to a second bandwidth part subsequent to the last slot of the wideband communications, where the second bandwidth part spans a narrower portion of the total bandwidth than the first bandwidth part.

An apparatus for wireless communication at a base station is described. The apparatus may include at least one processor, memory coupled (e.g., operatively, communicatively, functionally, electronically, or electrically) with the at least one processor, and instructions stored in the memory. The instructions may be executable by the at least one processor to cause the apparatus to transmit, to a UE, wideband communications over a first bandwidth part of a total bandwidth available for communications between the base station and the UE, transmit an end of burst indicator to the UE that identifies a last slot of the wideband communications, where the end of burst indicator is provided prior to transmission of the last slot of the wideband communications, and switch, based on the end of burst indicator, UE communications from the first bandwidth part to a second bandwidth part subsequent to the last slot of the wideband communications, where the second bandwidth part spans a narrower portion of the total bandwidth than the first bandwidth part.

Another apparatus for wireless communication at a base station is described. The apparatus may include means for transmitting, to a UE, wideband communications over a first bandwidth part of a total bandwidth available for communications between the base station and the UE, transmitting an end of burst indicator to the UE that identifies a last slot of the wideband communications, where the end of burst indicator is provided prior to transmission of the last slot of the wideband communications, and switching, based on the end of burst indicator, UE communications from the first bandwidth part to a second bandwidth part subsequent to the last slot of the wideband communications, where the second bandwidth part spans a narrower portion of the total bandwidth than the first bandwidth part.

A non-transitory computer-readable medium storing code for wireless communication at a base station is described. The code may include instructions executable by at least one processor to transmit, to a UE, wideband communications over a first bandwidth part of a total bandwidth available for communications between the base station and the UE, transmit an end of burst indicator to the UE that identifies a last slot of the wideband communications, where the end of burst indicator is provided prior to transmission of the last slot of the wideband communications, and switch, based on the end of burst indicator, UE communications from the first bandwidth part to a second bandwidth part subsequent to the last slot of the wideband communications, where the second bandwidth part spans a narrower portion of the total bandwidth than the first bandwidth part.

In some examples of the method, apparatuses, and non-transitory computer-readable medium described herein, the transmitting the end of burst indicator may include operations, features, means, or instructions for transmitting, after an initial transmission of the wideband communications, layer-one signaling to the UE that includes the end of burst indicator. In some examples of the method, apparatuses, and non-transitory computer-readable medium described herein, the layer-one signaling includes a flag in a scheduling DCI transmission that triggers the switching to the second bandwidth part. In some examples of the method, apparatuses, and non-transitory computer-readable medium described herein, the switching to the second bandwidth part is performed in a next slot following the last slot of the wideband communications.

Some examples of the method, apparatuses, and non-transitory computer-readable medium described herein may further include operations, features, means, or instructions for receiving, using the second bandwidth part, a feedback transmission from the UE that indicates successful or unsuccessful receipt of the wideband communications. Some examples of the method, apparatuses, and non-transitory computer-readable medium described herein may further include operations, features, means, or instructions for receiving, using the first bandwidth part, a feedback transmission from the UE that indicates successful or unsuccessful receipt of the wideband communications, and where the switching to the second bandwidth part may be performed after the feedback may be received from the UE.

Some examples of the method, apparatuses, and non-transitory computer-readable medium described herein may further include operations, features, means, or instructions for configuring the UE with a timing for switching from the second bandwidth part to a third bandwidth part to receive further wideband communications from the base station, where the third bandwidth part may have a same bandwidth as the first bandwidth part or a different bandwidth than the first bandwidth part, and transmitting, to the UE, the further wideband communications over the third bandwidth part. In some examples of the method, apparatuses, and non-transitory computer-readable medium described herein, the UE autonomously switches to the third bandwidth part based on one or more of a configured periodicity of wideband communications, an indication in control information, or any combinations thereof.

In some examples of the method, apparatuses, and non-transitory computer-readable medium described herein, the configured periodicity of wideband communications provides bandwidth part switching times and may be provided by one or more of RRC signaling that indicates a periodicity and an offset for bandwidth part switching, a DRX On-duration start time, information provided with the end of burst indicator, or any combinations thereof.

Some examples of the method, apparatuses, and non-transitory computer-readable medium described herein may further include operations, features, means, or instructions for determining that a retransmission of at least a portion of the wideband communications is to be transmitted to the UE, retransmitting at least the portion of the wideband communications over the first bandwidth part, and switching the UE from the first bandwidth part to the second bandwidth part subsequent to the retransmission of at least the portion of the wideband communications. In some examples of the method, apparatuses, and non-transitory computer-readable medium described herein, a time for the switching from the first bandwidth part to the second bandwidth part may be based on one or more of a first time duration between the last slot of the wideband communications and a feedback transmission associated with the wideband communications, a second time duration between the feedback transmission and one or more retransmissions associated with the feedback transmission, or any combinations thereof.

In some examples of the method, apparatuses, and non-transitory computer-readable medium described herein, the first bandwidth part may be maintained at the UE based on one or more of the first time duration or the second time duration being less than a time threshold value. In some examples of the method, apparatuses, and non-transitory computer-readable medium described herein, the time threshold value may be based on a bandwidth part switching time associated with the UE.

DETAILED DESCRIPTION

Figure 1:
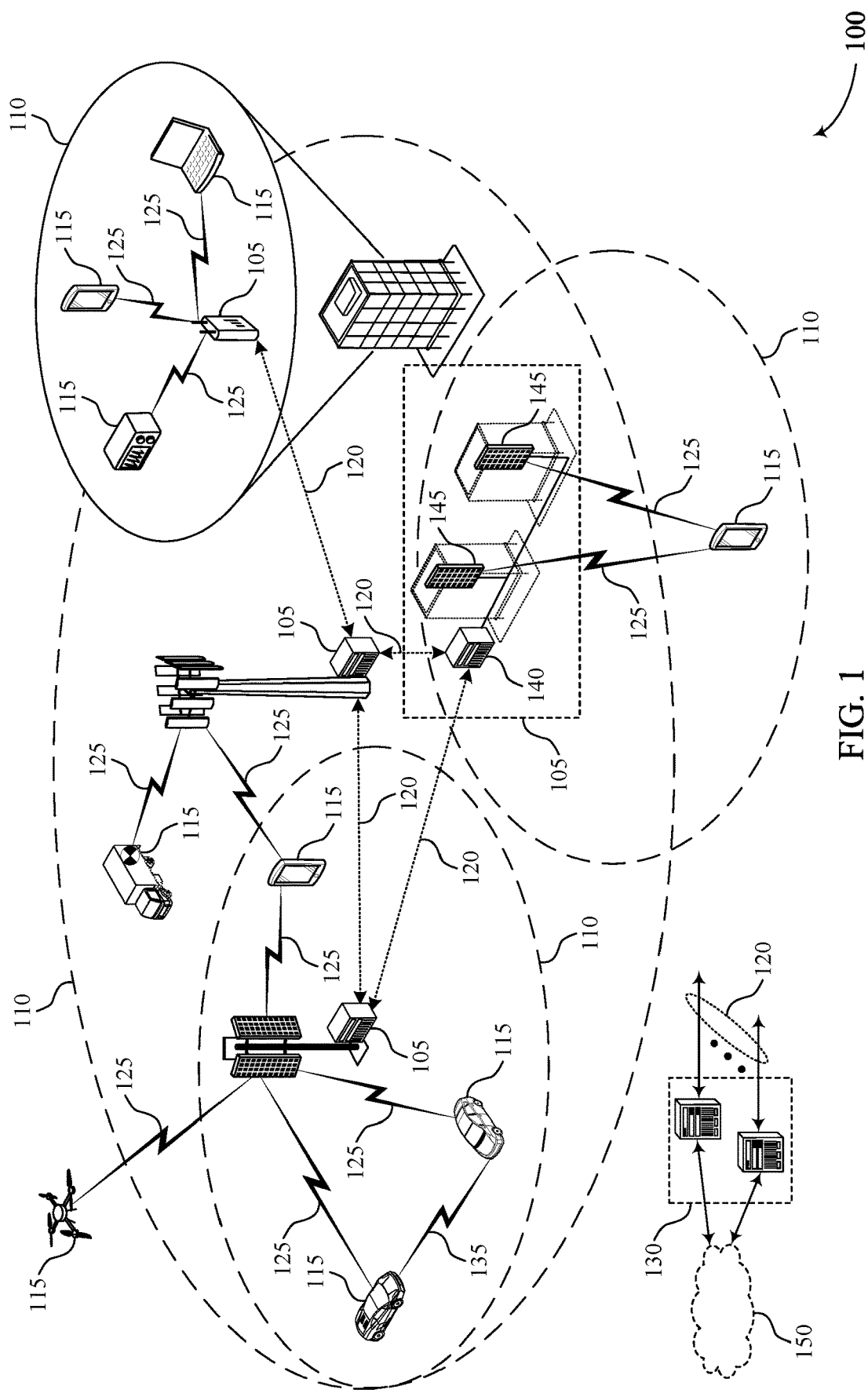
FIG. 1 illustrates an example of a system for wireless communications that supports bandwidth part switching techniques in wireless communications in accordance with aspects of the present disclosure.

A wireless communications system may support a variety of different types of communications in a variety of different channel conditions, and may select various transmission parameters based on particular type of communications and channel conditions that are present between a user equipment (UE) and a base station. In some cases, relatively large amount of data are present for communications between a UE and a base station, and a relatively wide communications bandwidth may be used to provide efficient transfer of the relatively large amount of data. In other cases, relatively smaller amounts of data may be present for communications, and a narrower communications bandwidth may be more suitable for transfer of such data. In order to have flexibility to configure a communications bandwidth that is suitable for communications types that may have relatively large or small amounts of data, a base station may configure a number of bandwidth parts (BWPs) for communications, each of which may occupy different portions of an available channel bandwidth. The number of BWPs may include one or more narrowband BWPs (e.g., having a bandwidth of 20 MHz), and one or more wideband BWPs (e.g., having a bandwidth of 80 MHz, 160 MHz, or higher). As used herein, wideband communications refer to communications using one or more wideband BWPs, and narrowband communications refer to communications using a narrowband BWP. Each BWP may be contiguous or non-contiguous in frequency.

In some cases, a UE may use a communications type in which relatively large amounts of data are communicated at regular intervals, resulting in periodic bursts of communications (which may be referred to as bursty communications). For example, a UE running a virtual reality (VR) or augmented reality (AR) application (which may be referred to generally as extended reality (XR) applications) may have data bursts that correspond to frame rates of the data that is communicated with the UE. In such cases, a UE may receive periodic XR frames in downlink communications bursts. In some cases, XR applications may support frame rates of 60 Hz or 120 Hz, where a 60 Hz frame rate results in a frame generation periodicity of 16.67 ms, and a 120 Hz frame rate results in a frame generation periodicity of 8.33 ms. An XR frame may be divided into multiple slices that are encoded separately, for example, and each encoded slice (or file) may be sent from an XR server to a serving base station. The slices can then be sent over the air through multiple transport blocks (TBs), or a burst of TBs, to the UE. Each burst may have a transmission delay requirement. In some cases, based on the quasi-periodic arrival at the base station of XR frames, (e.g., every 8.33 ms for 120 fps; 16.67 ms for 60 fps), it can be predicted when the UE should wake up and enable a wide BWP for communications. While various XR examples are discussed herein, these examples are provided for purposes of discussion and illustration only, and techniques discussed herein may be applied to various other types of communications that may have periodic communication bursts.

In accordance with various aspects discussed herein, a UE may transition between wideband BWPs and narrowband BWPs based on the periodicity of such communication bursts. Such switching may provide reduced power consumption and reduced processing overhead at the UE between the wideband BWP communications bursts. In some cases, an end of burst indicator may be provided with the wideband BWP communications that indicates a timing for switching from the wideband BWP to the narrowband BWP. In some cases, the end of burst indicator may be provided prior to a last downlink shared channel communication of the communications burst, and the UE may switch to the narrowband BWP upon completion of the last downlink shared channel communication. In some cases, the UE may switch to the narrowband BWP based on a timing between the last downlink shared channel communication of the communications burst and a feedback communication (e.g., a hybrid automatic repeat request (HARQ) feedback communication), based on a timing between the last downlink shared channel communication of the communications burst and a retransmission of a portion of the communication burst, or any combinations thereof. In some cases, the UE may switch from the narrowband BWP to the wideband BWP (or to a different wideband BWP) for a subsequent communications burst autonomously or based on an explicit indication.

Aspects of the disclosure are initially described in the context of wireless communications systems. Various examples of bandwidth switching are then discussed in accordance with various techniques provided herein. Aspects of the disclosure are further illustrated by and described with reference to apparatus diagrams, system diagrams, and flowcharts that relate to bandwidth part switching techniques in wireless communications.

FIG. 1 illustrates an example of a wireless communications system 100 that supports bandwidth part switching techniques in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, one or more UEs 115 and base stations 105 may periodically communicate relatively large amounts of data in communications bursts. In some cases, a wideband BWP may be used for such periodic communications bursts, and a UE 115 may switch to a narrowband BWP between the communications bursts, which may provide reduced power consumption and reduced processing overhead at the UE 115 between the wideband BWP communications bursts. In some cases, an end of burst indicator may be provided with the wideband BWP communications that indicates a timing for switching from the wideband BWP to the narrowband BWP.

Figure 2:
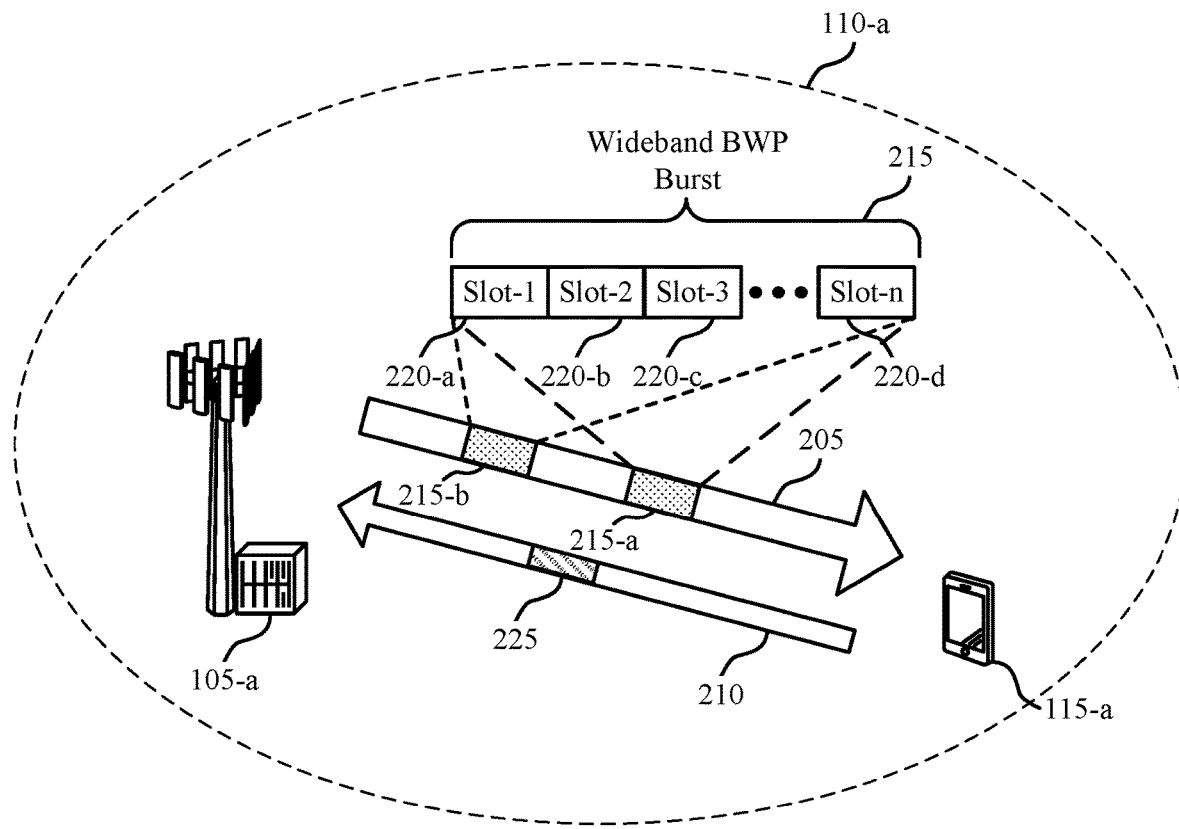
FIG. 2 illustrates an example of a portion of a wireless communications system that supports bandwidth part switching techniques in wireless communications in accordance with aspects of the present disclosure.

FIG. 2 illustrates an example of a wireless communications system 200 that supports bandwidth part switching techniques in wireless communications in accordance with aspects of the present disclosure. In some examples, wireless communications system 200 may implement aspects of wireless communications system 100. The wireless communications system 200 may include base station 105-a and UE 115-a which may be examples of a base station or UE described above with reference to FIG. 1. Base station 105-a and UE 115-a may communicate with one another within coverage area 110-a using downlink 205 and uplink 210 communications and using techniques as discussed herein. The wireless communications system 200 may provide for periodic wideband communications bursts for certain communication types, in which switching between wideband BWPs and narrowband BWPs may be performed to enhance system reliability and efficiency, and to provide power savings.

In the example of FIG. 2, the base station 105-a may transmit and the UE 115-a may receive periodic wideband BWP bursts 215, which may include a first wideband BWP burst 215-a and a second wideband BWP burst 215-b that are illustrated in this example. In some cases, the wideband BWP bursts 215 may span a same or different number of slots 220, where each slot may include physical downlink control channel (PDCCH) resources (e.g., that may be used to provide downlink control information (DCI)) and physical downlink shared channel (PDSCH) resources (e.g., that may be used to transmit data of the communications burst). In some cases, the UE 115-a may transmit feedback 225 (e.g., HARQ ACK/NACK feedback) to the base station 105-a that indicates successful or unsuccessful reception of TBs of the wideband BWP bursts 215.

In some cases, the UE 115-a may transition between wideband BWPs and narrowband BWPs based on a periodicity of the wideband BWP bursts 215. In some cases, an end of burst indicator may be provided with the wideband BWP communications that indicates a timing for switching from the wideband BWP to the narrowband BWP. For example, DCI transmitted in a PDCCH of a last slot 220-d of a wideband BWP burst 215 may include a flag that indicates that the corresponding PDSCH is a last PDSCH of the wideband BWP burst 215. Based on the end of burst indicator, the UE 115-a may transition to the narrowband BWP upon completion of the last PDSCH communication. In some cases, the UE 115-a may switch to the narrowband BWP based on a timing between the last PDSCH communication of the wideband BWP burst 215 and the feedback 225 communication, based on a timing between the last PDSCH communication of the of the wideband BWP burst 215 and a retransmission of a portion of the communication (e.g., based on a NACK provided with the feedback 225), or any combinations thereof. In some cases, the UE 115-a may switch from the narrowband BWP to the wideband BWP (or to a different wideband BWP) for a subsequent wideband BWP burst 215 autonomously or based on an explicit indication provided in a DCI from the base station 105-a. For example, the wideband BWP bursts 215 may include XR frame data that may be transmitted according to a frame generation periodicity, such as discussed with reference to FIG. 3.

Figure 3:
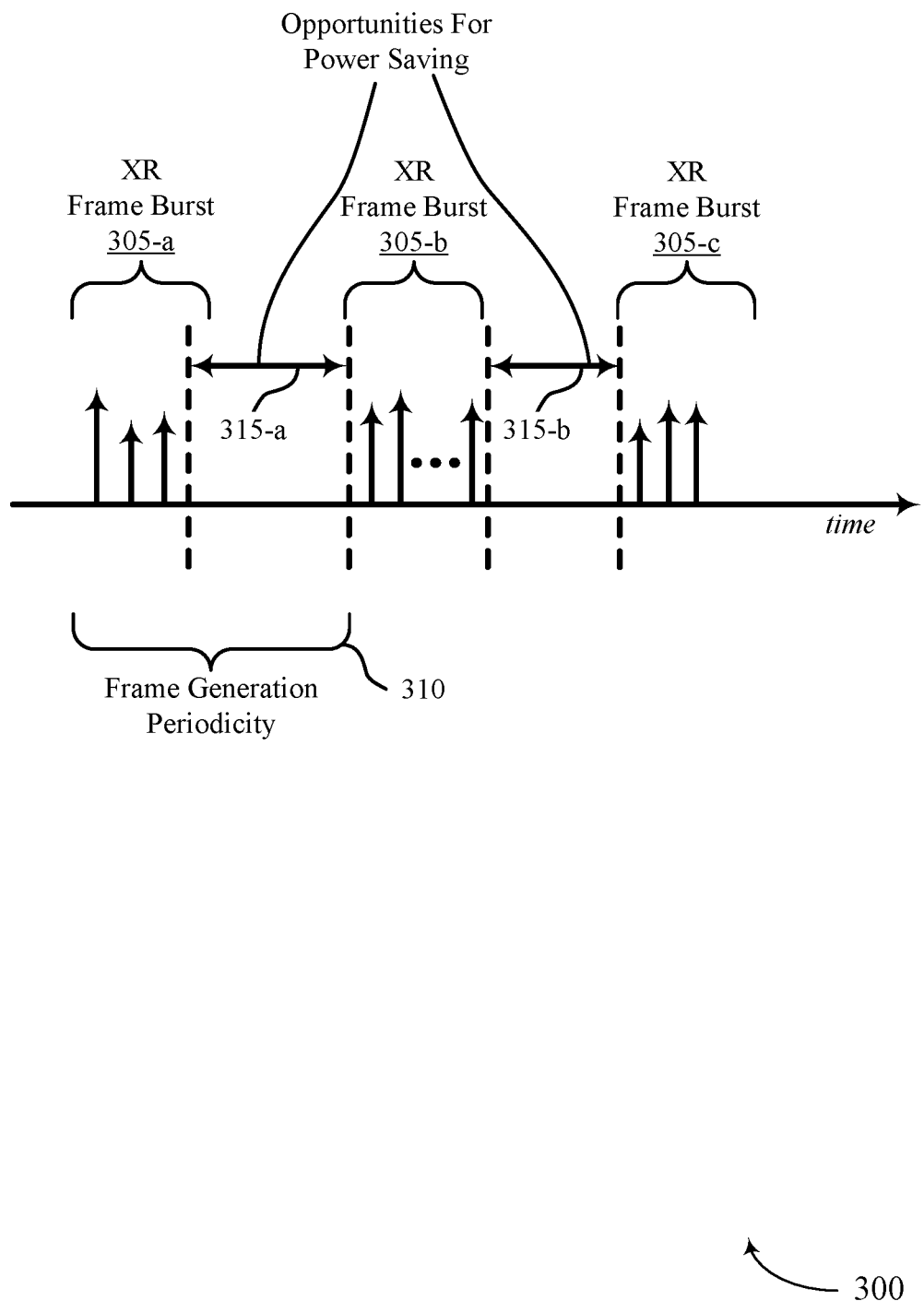
FIG. 3 illustrates an example of wideband communications bursts that support bandwidth part switching techniques in wireless communications in accordance with aspects of the present disclosure.

FIG. 3 illustrates an example of a wideband communications bursts 300 that supports bandwidth part switching techniques in wireless communications in accordance with aspects of the present disclosure. In some examples, wideband communications bursts 300 may implement aspects of wireless communications system 100 or 200. In this example, a UE (e.g., a UE 115 of FIG. 1 or 2) may engage in XR type communications with a base station (e.g., a base station 105 of FIG. 1 or 2). As discussed herein, such XR communications may provide relatively large amounts of data in communications bursts.

For example, a number of XR frame bursts 305 may be transmitted from the base station to the UE. The XR frame bursts 305 may be transmitted according to a frame generation periodicity 310, which may be based on a frame rate of the XR application (e.g., a 60 Hz or 120 Hz frame rate, which provide a frame generation periodicity of 16.67 ms or 8.33 ms respectively). Thus, in such cases, the UE may receive such bursts, and opportunities for power saving 315 may be present between the XR frame bursts 305. As discussed above, an XR frame may be divided into multiple slices that may be separately encoded, and each encoded slice (or file) sent from an XR server to the base station. The base station may transmit the slices over the air through multiple TBs (a burst of TBs) that may be transmitted using a wideband BWP, and after a last TB of a burst the UE may switch to a narrowband BWP in order to reduce power consumption. In accordance with various techniques discussed herein, an end of burst indicator may be provided to the UE to indicate the last portion of a communications burst. Such techniques may allow the UE to transition to the narrowband BWP more quickly than other techniques for BWP switching, such as discussed with reference to FIGS. 4 and 5.

Figure 4:
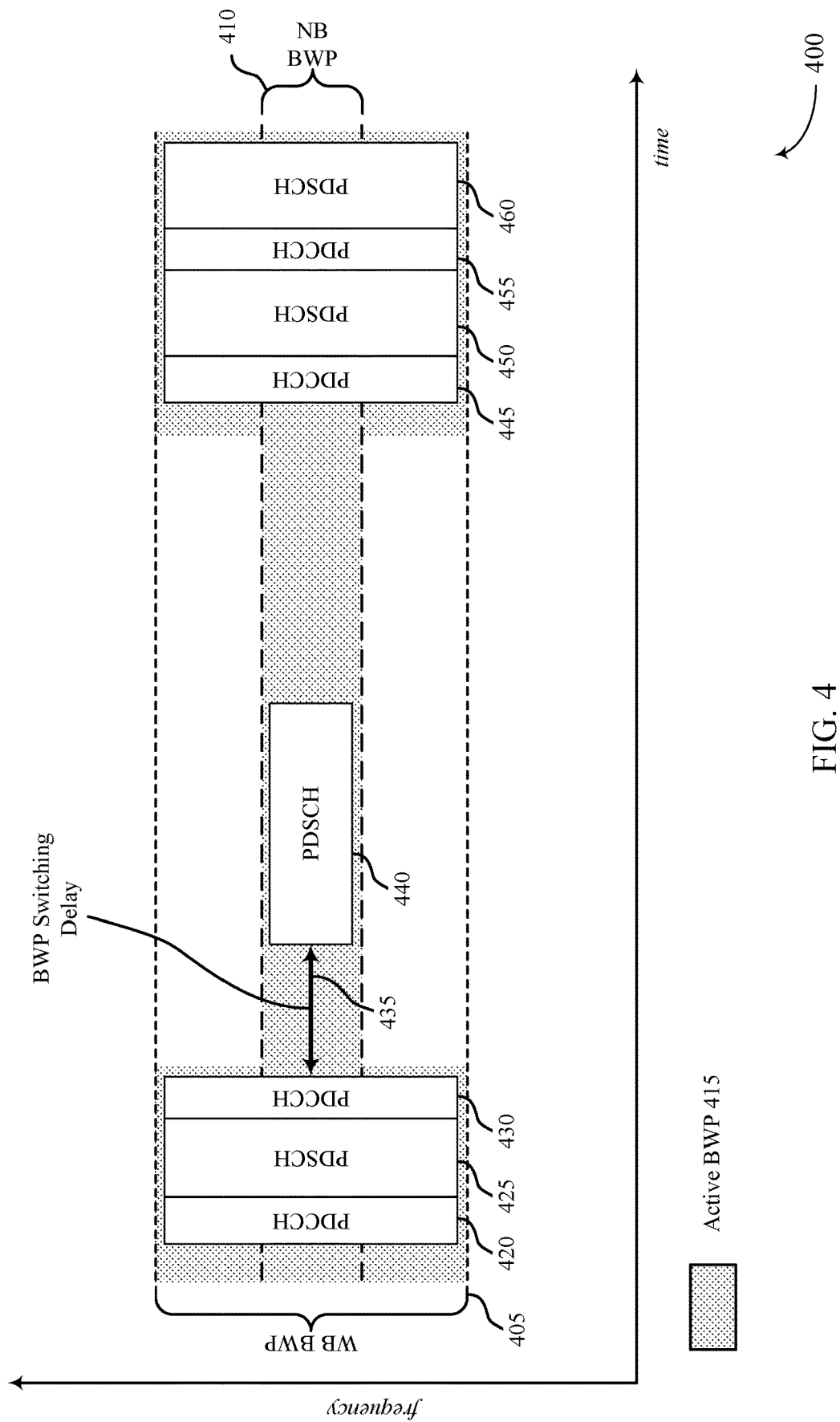
FIGS. 4 through 7 illustrate examples of BWP switching that support bandwidth part switching techniques in wireless communications in accordance with aspects of the present disclosure.

FIG. 4 illustrates an example of a BWP switching timing 400 that supports bandwidth part switching techniques in wireless communications in accordance with aspects of the present disclosure. In some examples, BWP switching timing 400 may implement aspects of wireless communications system 100 or 200. In this example, a UE (e.g., a UE of FIG. 1 or 2) may be configured with a wideband BWP 405 and a narrowband BWP 410, and thus an active BWP 415 of the UE may be different at different times. While this example illustrates a single wideband BWP 405 and a single narrowband BWP 410, in some cases multiple wideband BWPs, multiple narrowband BWPs, or combinations thereof, may be configured and UEs and base stations may switch among the different BWPs.

In some cases, according to traditional BWP switching techniques, a base station (e.g., a base station of FIG. 1 or 2) may transmit Layer 1 (L1) signaling (e.g., in a DCI communication via PDCCH) that triggers BWP switching for the associated PDSCH. For example, a first PDCCH 420 and associated first PDSCH 425 may be transmitted using the wideband BWP 405. A second PDCCH 430 may be transmitted using the wideband BWP 405, and may include a BWP change indication to trigger the UE to switch to the narrowband BWP 410 for the associated second PDSCH 440. The UE may have a BWP switching delay 435 time period, and thus the transmission of the second PDSCH 440 using such techniques does not begin until after the BWP switching delay 435. Further, in cases where the second PDSCH 440 contains a relatively large amount of data (e.g., as part of a XR frame), the narrowband BWP 410 transmission thereof may result in a relatively long duration of the PDSCH 440. Thus, such a technique for BWP switching, while allowing for relatively fast switching of the UE to the narrowband BWP 410 and providing associated power savings, also results in some delay associated with a last portion of the communications burst. Further, a subsequent communications burst may include a third PDCCH 445, a third PDSCH 450, a fourth PDCCH 455 and a fourth PDSCH 460 that are transmitted using the wideband BWP 405 (e.g., based on an explicit indication to switch BWPs provided to the UE). In some cases, the communications burst may have relatively low latency targets, and thus it may be desired to switch to the narrowband BWP 410 after the second PDSCH 440, and traditional BWP switching for such a case is illustrated in FIG. 5.

Figure 5:
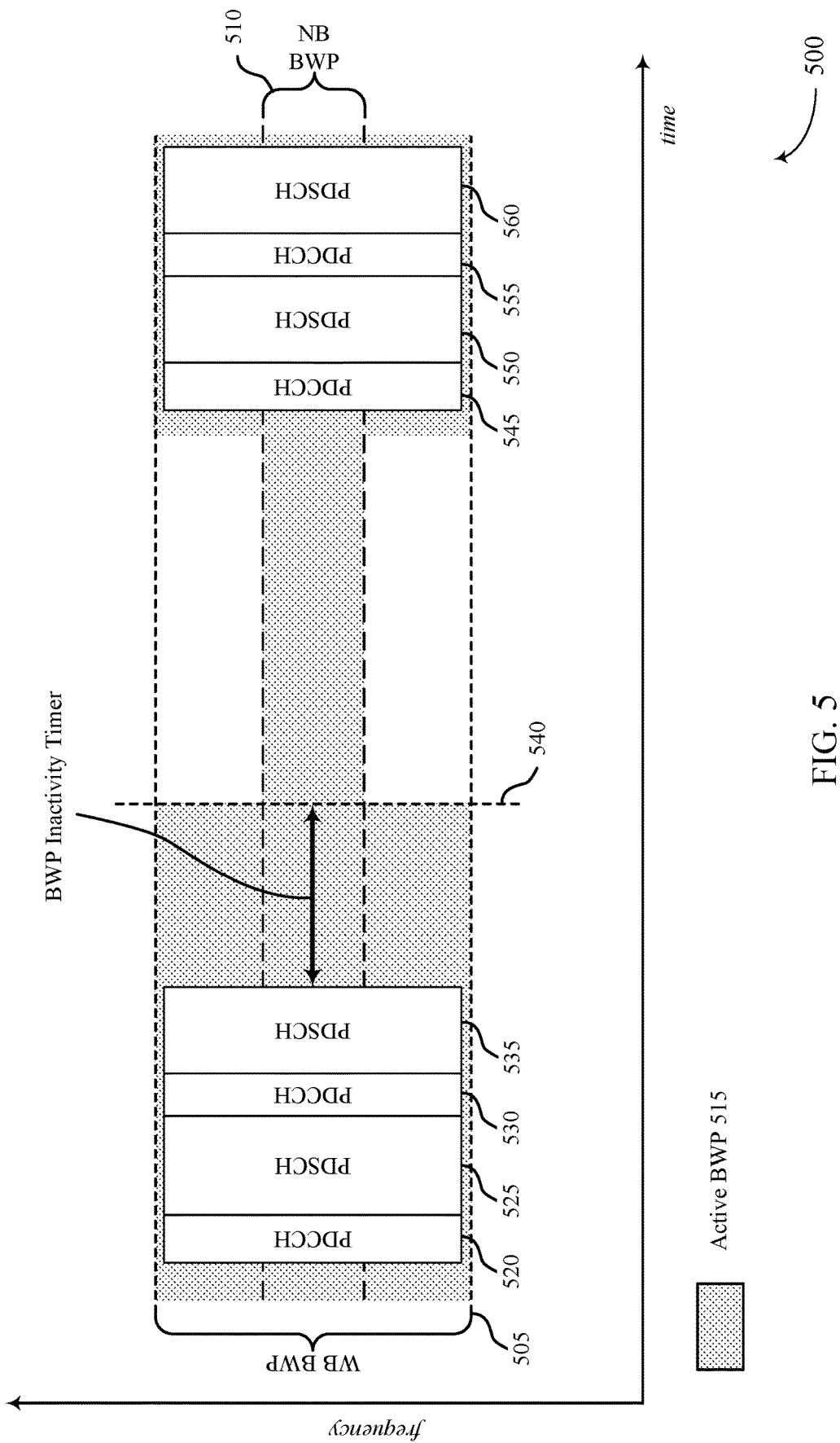

FIG. 5 illustrates an example of a BWP switching timing 500 that supports bandwidth part switching techniques in wireless communications in accordance with aspects of the present disclosure. In some examples, BWP switching timing 500 may implement aspects of wireless communications system 100 or 200. In this example, a UE (e.g., a UE of FIG. 1 or 2) may be configured with a wideband BWP 505 and a narrowband BWP 510, and thus an active BWP 515 of the UE may be different at different times. While this example illustrates a single wideband BWP 505 and a single narrowband BWP 510, in some cases multiple wideband BWPs, multiple narrowband BWPs, or combinations thereof, may be configured and UEs and base stations may switch among the different BWPs.

In this example, according to traditional BWP switching techniques, a base station (e.g., a base station of FIG. 1 or 2) may transmit a communications burst using the wideband BWP 505 that includes a first PDCCH 520 and associated first PDSCH 525, and a second PDCCH 530 and associated second PDSCH 535 may be transmitted using the wideband BWP 505. In this example the second PDSCH 535 is transmitted using the wideband BWP 505, which is different than in the example of FIG. 4. In this example, the UE may switch to the narrowband BWP 510 subsequent to the second PDSCH 535 at time 540 that is based on an expiration of a BWP inactivity timer. In such cases, the UE may be configured with a default BWP that is the narrowband BWP 510, and when communicating on a different BWP, the BWP inactivity timer may be started when the second PDSCH 535 is complete and may cause the UE to switch to the default BWP when communications on the different BWP (e.g., the wideband BWP 505 in this example) are idle for the duration of the BWP inactivity timer.

Thus, in this example, the UE may maintain the wideband BWP 505 a time period after the second PDSCH 535, and may monitor for communications from the base station using the wideband BWP 505. In some cases, the duration of the BWP inactivity timer may be set to be a relatively short duration to consume low power, and may be set to be long enough to cover a potential scheduling gap in the wideband communications. Thus, such a technique may allow the second PDSCH 535 to be transmitted using the wideband BWP 505 and thus be completed more quickly than in the example of FIG. 4. However, such a technique will cause the UE to use additional power for monitoring for communications on the wideband BWP 505 compared to a power consumption if the UE were to switch to the narrowband BWP 510. Further, a subsequent communications burst may include a third PDCCH 545, a third PDSCH 550, a fourth PDCCH 555 and a fourth PDSCH 560 that are transmitted using the wideband BWP 505 (e.g., based on an explicit indication to switch BWPs provided to the UE).

Figure 6:
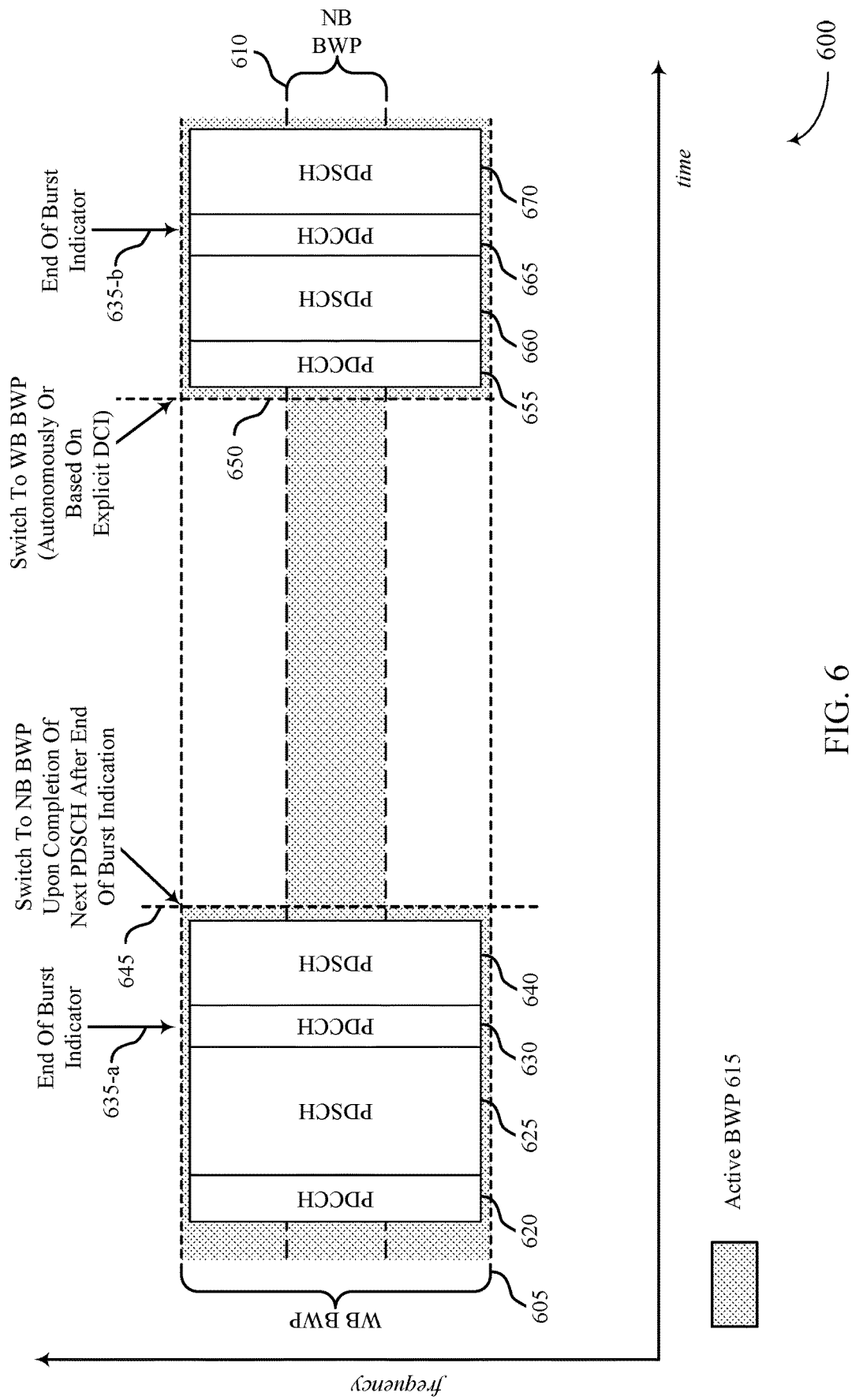
Figure 7:
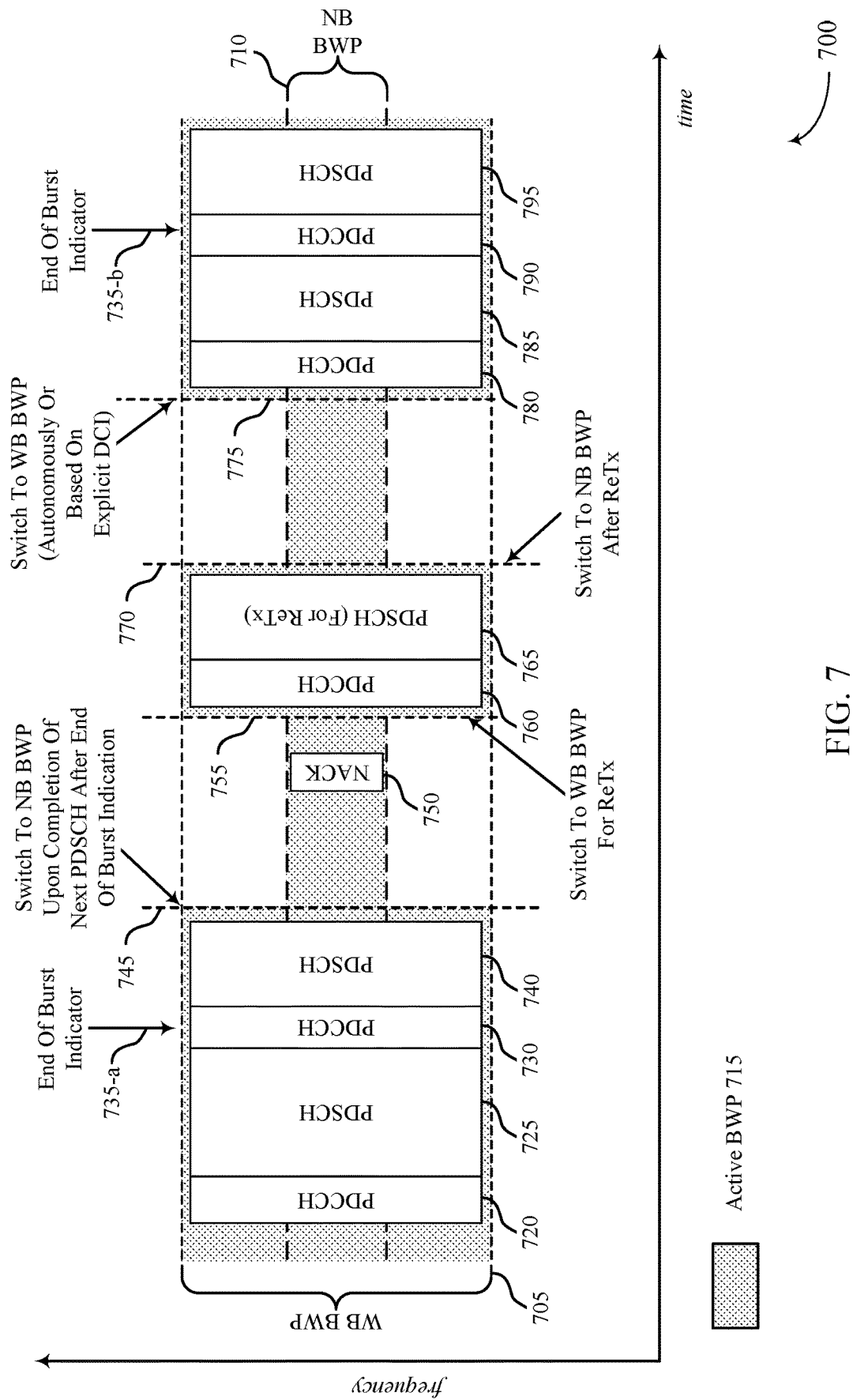

Thus, traditional BWP switching techniques as illustrated in FIGS. 4 and 5 may result in increased latency, increased power consumption, or both, compared to techniques as discussed herein in which the UE may maintain wideband BWP 505 communications for a last PDSCH of a burst and then switch to the narrowband BWP 510 based on an end of burst indicator. FIGS. 6 and 7 provide examples of BWP switching techniques based on an end of burst indicator.

FIG. 6 illustrates an example of a BWP switching timing 600 that supports bandwidth part switching techniques in wireless communications in accordance with aspects of the present disclosure. In some examples, BWP switching timing 600 may implement aspects of wireless communications system 100 or 200. In this example, a UE (e.g., a UE of FIG. 1 or 2) may be configured with a wideband BWP 605 and a narrowband BWP 610, and thus an active BWP 615 of the UE may be different at different times. While this example illustrates a single wideband BWP 605 and a single narrowband BWP 610, in some cases multiple wideband BWPs, multiple narrowband BWPs, or combinations thereof, may be configured and UEs and base stations may switch among the different BWPs.

In this example, a base station (e.g., a base station of FIG. 1 or 2) may transmit a communications burst using the wideband BWP 605 that includes a first PDCCH 620 and associated first PDSCH 625, and a second PDCCH 630 and associated second PDSCH 640 may be transmitted using the wideband BWP 605. In this example, the base station may transmit a first end of burst indicator 635-*a* with the second PDCCH 630 that may indicate that the second PDSCH 640 is the last PDSCH of the communications burst. Based on the first end of burst indicator, the UE may switch to the narrowband BWP 610 at time 645 upon completion of the next PDSCH after receipt of the first end of burst indicator 635-*a*.

In this example, the UE may switch back to the wideband BWP 605 at time 650. In some cases, the base station may transmit a DCI to the UE to indicate the switch to the wideband BWP 605. In other cases, the UE may autonomously switch to the wideband BWP 605 based on a configuration associated with the communications bursts. For example, a UE may be configured with a periodicity and offset of communications bursts (e.g., based on a XR communications frame rate), and may switch to the wideband BWP 605 based on the configuration. In this example a second communications burst may include a third PDCCH 655 and associated third PDSCH 660, and a fourth PDCCH 665 and associated fourth PDSCH 670. A second end of burst indicator 635-*b* may be transmitted with the fourth PDCCH 665 that indicates that the fourth PDSCH 670 is the last PDSCH of the communications burst, and the UE may again switch to the narrowband BWP 610 subsequent to the fourth PDSCH 670.

In some cases, the end of burst indicators 635 may be indicated to the UE in a L1 signal from the base station. For example, a flag in a DCI provided in PDCCH may indicate an end of a communications burst, which may trigger the UE to switch to the narrowband BWP after the PDSCH that is associated with the DCI. In other cases, the L1 signal may further include an indication of a BWP that the UE is to switch to after the associated PDSCH (e.g., in cases where the UE switches to a BWP other than a default BWP). Further, in some cases the wideband BWP may be different for different communications bursts (e.g., based on a signal provided in DCI that triggers a switch to the wideband BWP).

In some cases, the UE may switch to the narrowband BWP 610 immediately after receiving the PDSCH that is associated with the DCI that provides the end of burst indicator 635. In such cases, the UE may use the narrowband BWP 610 to transmit a feedback associated with the communications burst (e.g., HARQ ACK/NACK feedback). In other cases, the UE may transmit the feedback to the base station using the wideband BWP 605, and then switch to the narrowband BWP 610 after the feedback transmission. In some cases, an amount of time (e.g., based on a feedback timeline) between the last PDSCH and the transmission of the feedback may determine whether the UE switches to the narrowband BWP 610 before or after transmitting the feedback (e.g., if the feedback timing is below a threshold value, the wideband BWP 605 may be used to transmit the feedback, otherwise the narrowband BWP 610 is used). In further cases, as will be discussed in more detail with reference to FIG. 7, switching between the BWPs may be further based on whether a retransmission is triggered by the feedback (e.g., based on a NACK indication in the feedback).

When switching from the narrowband BWP 610 to the wideband BWP 605, the UE may receive a DCI that triggers the switching, or may autonomously perform the switching based on a configured BWP switching for a series of wideband communications bursts. In some cases, when the UE is configured to autonomously switch BWPs, the configuration may be provided by RRC signaling (e.g., RRC signaling provides a (e.g., periodicity and offset for a switching time for downlink communications bursts). In other cases, the UE may follow a discontinuous reception (DRX) On-duration start time. In still other cases, the PDCCH that provides the end of burst indication may also indicate a duration that the UE is to remain in the wideband BWP 605, a duration that the UE is to remain in the narrowband BWP 610, or any combinations thereof. In some cases, the UE may continue the BWP switching for a duration of communications that use the communication bursts, and may discontinue the BWP switching based on a reconfiguration away from the communications bursts.

FIG. 7 illustrates an example of a BWP switching timing 700 that supports bandwidth part switching techniques in wireless communications in accordance with aspects of the present disclosure. In some examples, BWP switching timing 700 may implement aspects of wireless communications system 100 or 200. In this example, a UE (e.g., a UE of FIG. 1 or 2) may be configured with a wideband BWP 705 and a narrowband BWP 710, and thus an active BWP 715 of the UE may be different at different times. While this example illustrates a single wideband BWP 705 and a single narrowband BWP 710, in some cases multiple wideband BWPs, multiple narrowband BWPs, or combinations thereof, may be configured and UEs and base stations may switch among the different BWPs.

In this example, similarly as in the example of FIG. 6, a base station (e.g., a base station of FIG. 1 or 2) may transmit a communications burst using the wideband BWP 705 that includes a first PDCCH 720 and associated first PDSCH 725, and a second PDCCH 730 and associated second PDSCH 740 may be transmitted using the wideband BWP 705. In this example, the base station may transmit a first end of burst indicator 735-a with the second PDCCH 730 that may indicate that the second PDSCH 740 is the last PDSCH of the communications burst. Based on the first end of burst indicator, the UE may switch to the narrowband BWP 710 at time 745 upon completion of the next PDSCH after receipt of the first end of burst indicator 735-a.

In this example, the UE may transmit feedback information 750 (e.g., HARQ ACK/NACK feedback) to the base station that indicates a NACK, and thus triggers a retransmission of communications (e.g., one or more TBs) associated with the NACK. In this example, the feedback information 750 is transmitted following the switch of the UE to the narrowband BWP 710, although in other cases the UE may remain in the wideband BWP 705 for the transmission of the feedback information 750. In the example of FIG. 7, the UE at time 755 may switch to the wideband BWP 705 for a retransmission that is triggered by the feedback information 750, and the retransmission may include a third PDCCH 760 and associated third PDSCH 765 with the retransmitted data. In some cases, the base station may transmit an end of burst indicator with a PDSCH of the retransmission to indicate that the UE is to switch back the narrowband BWP 710 at time 770. In other cases, the UE may switch back to the narrowband BWP 710 based on an amount of data that is to be retransmitted in response to NACK feedback.

In this example, at time 775, the UE may switch to the wideband BWP 705 for a second communications burst. As discussed herein, the UE may switch to the wideband BWP 705 based on a DCI received from the base station, or may autonomously switch to the wideband BWP 705. The UE may then receive a fourth PDCCH 780 and associated fourth PDSCH 785, followed by a fifth PDCCH 790 and associated fifth PDSCH 795. The fifth PDCCH may include a second end of burst indicator 735-b that indicates that the fifth PDSCH 795 is a last PDSCH of that particular communications burst, and the UE may switch back to the narrowband BWP 710 after the associated PDSCH.

While the example of FIG. 7 shows the UE switching to the narrowband BWP 710 prior to transmission of the feedback information 750 and then switching to the wideband BWP 705 for the corresponding retransmission, in other cases the UE may remain using the wideband BWP 705 for the transmission of the feedback information 750. The UE may then switch to the narrowband BWP 710, or may remain in the wideband BWP 705 until the retransmission is complete. In some cases, whether the UE switches to the narrowband BWP 710 before or after transmission of the feedback information 750 may be determined based on feedback timing and an expected time delay prior to the retransmission. For example, the UE may determine BWP switching based on a K1 value of a feedback timeline used for the communications with the base station (e.g., if K1 is small relative to a BWP switching time, the UE may skip switching BWPs). In some cases, the feedback timeline, BWP switching time, or both, may be based on a capability or supported switching times of the UE. In some cases, the NACK indication in the feedback information 750 may trigger the UE to switch back to the wideband BWP 705 for the retransmission. Such techniques thus allow for flexibility in switching of BWPs based on UE capability and feedback timing.

Figure 8:
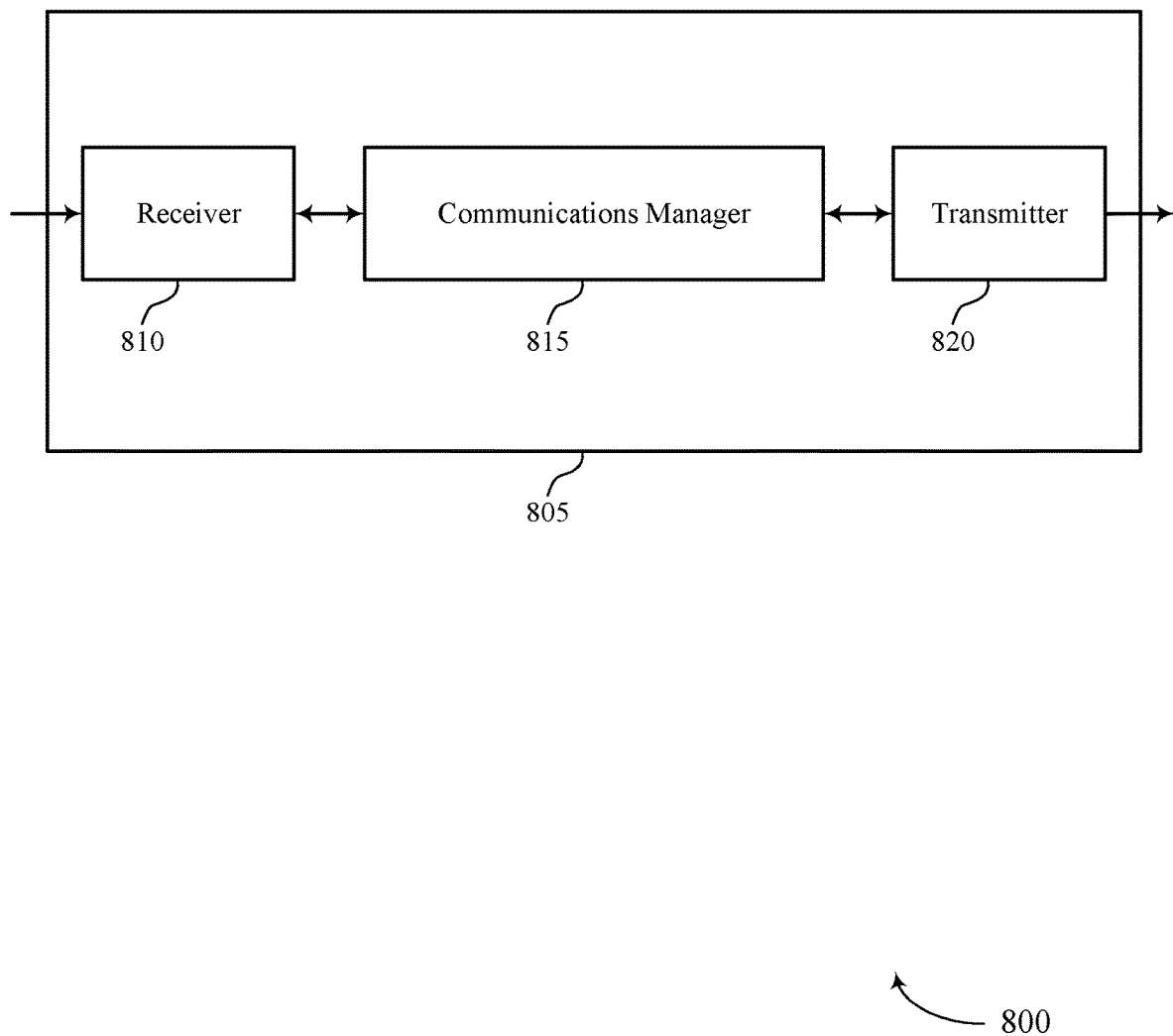
FIGS. 8 and 9 show block diagrams of devices that support bandwidth part switching techniques in wireless communications in accordance with aspects of the present disclosure.

FIG. 8 shows a block diagram 800 of a device 805 that supports bandwidth part switching techniques in wireless communications in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to bandwidth part switching techniques in wireless communications). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station, wideband communications over a first bandwidth part of a total bandwidth available for communications between the base station and the UE, identify a last slot of the wideband communications based on an end of burst indicator provided with control information from the base station, where the last slot of the wideband communications is identified prior to reception of the last slot of the wideband communications, and switch, based on the identifying, from the first bandwidth part to a second bandwidth part subsequent to the last slot of the wideband communications, where the second bandwidth part spans a narrower portion of the total bandwidth than the first bandwidth part. The communications manager 815 may be an example of aspects of the communications manager 1110 described herein.

The communications manager 815 may as described herein be implemented to realize one or more potential advantages. One implementation may allow the device 805 to perform BWP switching and conserve power for communications of periodic wideband bursts (e.g., for communications of XR frames), which may enhance UE operation and efficiency. Further, implementations may allow the device 805 to reduce processing overhead between wideband communications bursts, which may reduce heat generation of the UE and reduce the likelihood of throttling based on thermal limits at the UE, which may increase communications reliability, throughput, and enhance user experience, while reducing overall power consumption, among other advantages.

The communications manager 815, or its sub-components, may be implemented in hardware, code (e.g., software) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
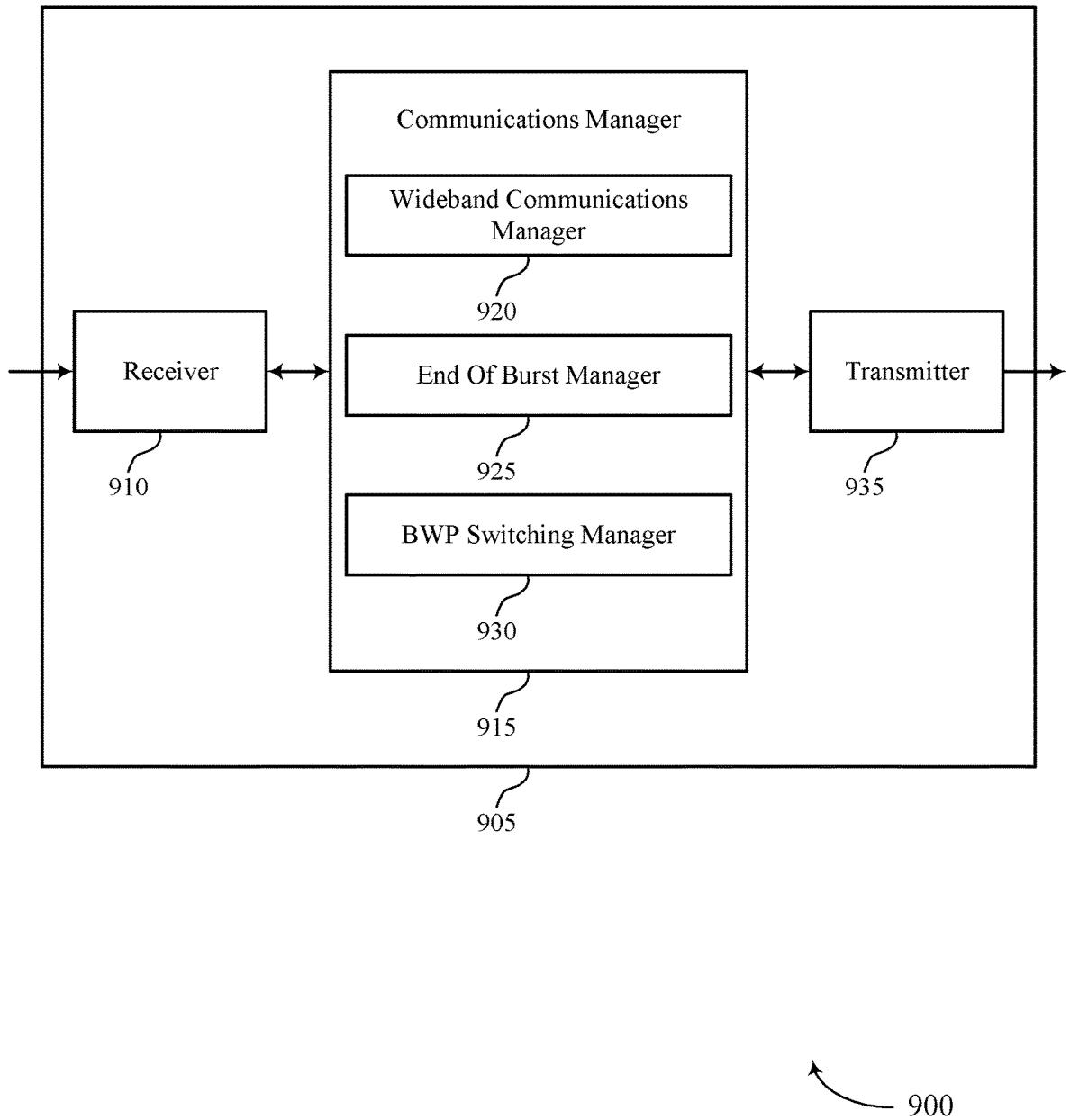

FIG. 9 shows a block diagram 900 of a device 905 that supports bandwidth part switching techniques in wireless communications in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to bandwidth part switching techniques in wireless communications). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a wideband communications manager 920, an end of burst manager 925, and a BWP switching manager 930. The communications manager 915 may be an example of aspects of the communications manager 1110 described herein.

The wideband communications manager 920 may receive, from a base station, wideband communications over a first bandwidth part of a total bandwidth available for communications between the base station and the UE.

The end of burst manager 925 may identify a last slot of the wideband communications based on an end of burst indicator provided with control information from the base station, where the last slot of the wideband communications is identified prior to reception of the last slot of the wideband communications.

The BWP switching manager 930 may switch, based on the identifying, from the first bandwidth part to a second bandwidth part subsequent to the last slot of the wideband communications, where the second bandwidth part spans a narrower portion of the total bandwidth than the first bandwidth part.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
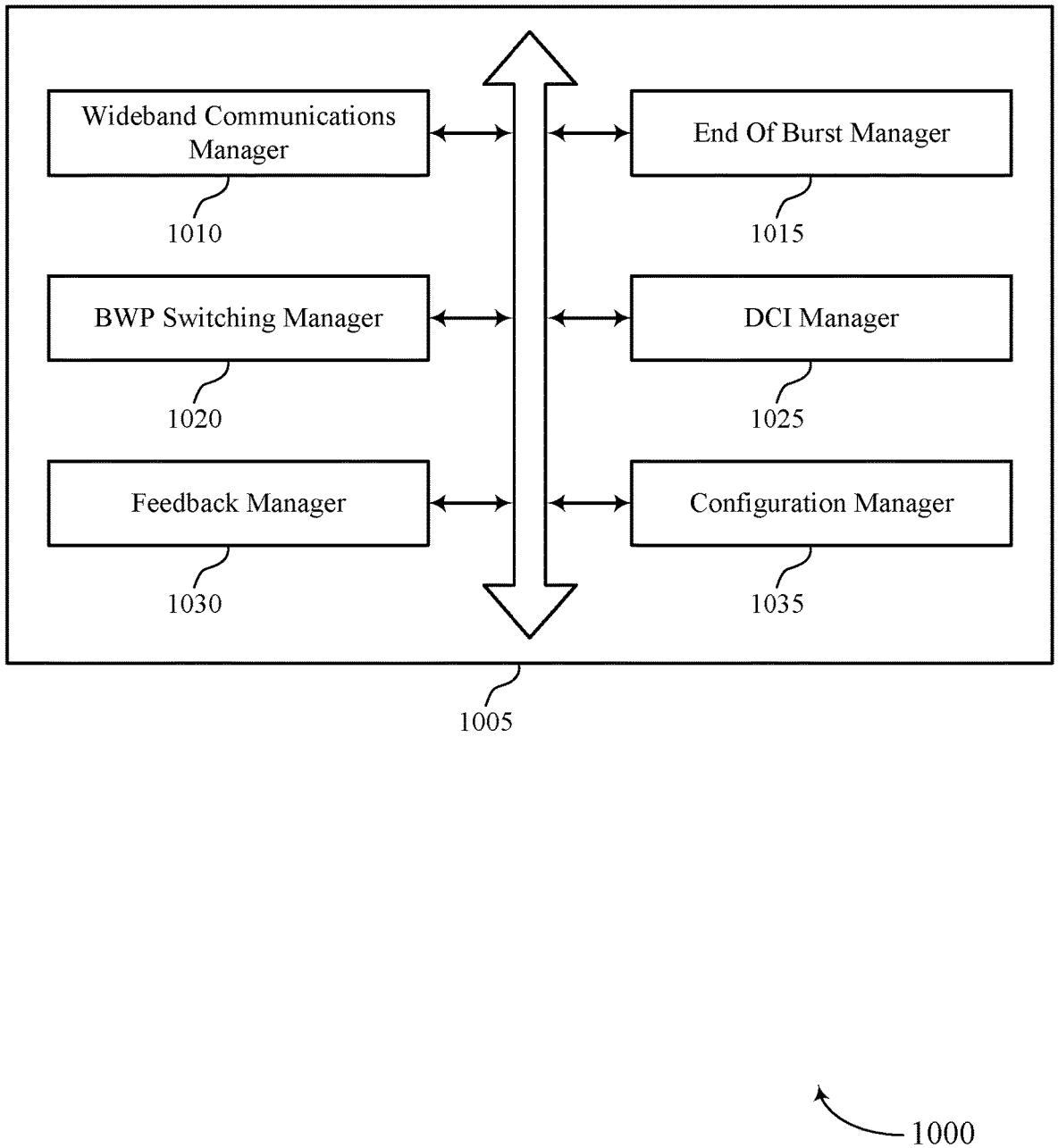
FIG. 10 shows a block diagram of a communications manager that supports bandwidth part switching techniques in wireless communications in accordance with aspects of the present disclosure.

FIG. 10 shows a block diagram 1000 of a communications manager 1005 that supports bandwidth part switching techniques in wireless communications in accordance with aspects of the present disclosure. The communications manager 1005 may be an example of aspects of a communications manager 815, a communications manager 915, or a communications manager 1110 described herein. The communications manager 1005 may include a wideband communications manager 1010, an end of burst manager 1015, a BWP switching manager 1020, a DCI manager 1025, a feedback manager 1030, and a configuration manager 1035. Each of these modules may communicate, directly or indirectly, with one another (e.g., via one or more buses).

The wideband communications manager 1010 may receive, from a base station, wideband communications over a first bandwidth part of a total bandwidth available for communications between the base station and the UE. In some examples, the wideband communications manager 1010 may determine that a retransmission of at least a portion of the wideband communications is to be received from the base station. In some examples, the wideband communications manager 1010 may switch from the second bandwidth part to the first bandwidth part based on the determining. In some examples, the wideband communications manager 1010 may receive the retransmission of at least the portion of the wideband communications.

The end of burst manager 1015 may identify a last slot of the wideband communications based on an end of burst indicator provided with control information from the base station, where the last slot of the wideband communications is identified prior to reception of the last slot of the wideband communications. In some examples, the end of burst manager 1015 may receive, from the base station after an initial transmission of the wideband communications, layer-one signaling that includes the end of burst indicator.

The BWP switching manager 1020 may switch, based on the identifying, from the first bandwidth part to a second bandwidth part subsequent to the last slot of the wideband communications, where the second bandwidth part spans a narrower portion of the total bandwidth than the first bandwidth part. In some examples, the BWP switching manager 1020 may identify, based on the control information, a timing for switching from the second bandwidth part to a third bandwidth part to receive further wideband communications from the base station. In some examples, the BWP switching manager 1020 may switch, based on the identifying the timing, to the third bandwidth part, where the third bandwidth part has a same bandwidth as the first bandwidth part or a different bandwidth than the first bandwidth part. In some examples, the BWP switching manager 1020 may receive, from the base station, further wideband communications over the third bandwidth part.

In some examples, the BWP switching manager 1020 may switch from the first bandwidth part to the second bandwidth part subsequent to the retransmission of at least the portion of the wideband communications. In some cases, the switching to the second bandwidth part is performed in a next slot following the last slot of the wideband communications. In some cases, the UE autonomously switches to the third bandwidth part based on one or more of a configured periodicity of wideband communications, an indication in the control information, or any combinations thereof.

In some cases, a time for the switching from the first bandwidth part to the second bandwidth part is based on one or more of a first time duration between the last slot of the wideband communications and a feedback transmission associated with the wideband communications, a second time duration between the feedback transmission and one or more retransmissions associated with the feedback transmission, or any combinations thereof. In some cases, the first bandwidth part is maintained at the UE based on one or more of the first time duration or the second time duration being less than a time threshold value. In some cases, the time threshold value is based on a bandwidth part switching time associated with the UE.

The DCI manager 1025 may receive and decode DCI from a serving base station. In some cases, the layer-one signaling that provides the end of burst indicator includes a flag in a scheduling DCI transmission that triggers the switching to the second bandwidth part.

The feedback manager 1030 may determine feedback that indicates successful or unsuccessful receipt of the wideband communications. In some examples, the feedback manager 1030 may transmit the feedback to the base station using the second bandwidth part. In some examples, the feedback manager 1030 may transmit the feedback to the base station using the first bandwidth part, and where the switching to the second bandwidth part is performed after the feedback is transmitted to the base station.

The configuration manager 1035 may receive configuration information and configure communications based on the configuration information. In some cases, the configured periodicity of wideband communications provides bandwidth part switching times and is provided by one or more of RRC signaling that indicates a periodicity and an offset for bandwidth part switching, a DRX On-duration start time, information provided with the end of burst indicator, or any combinations thereof.

Figure 11:
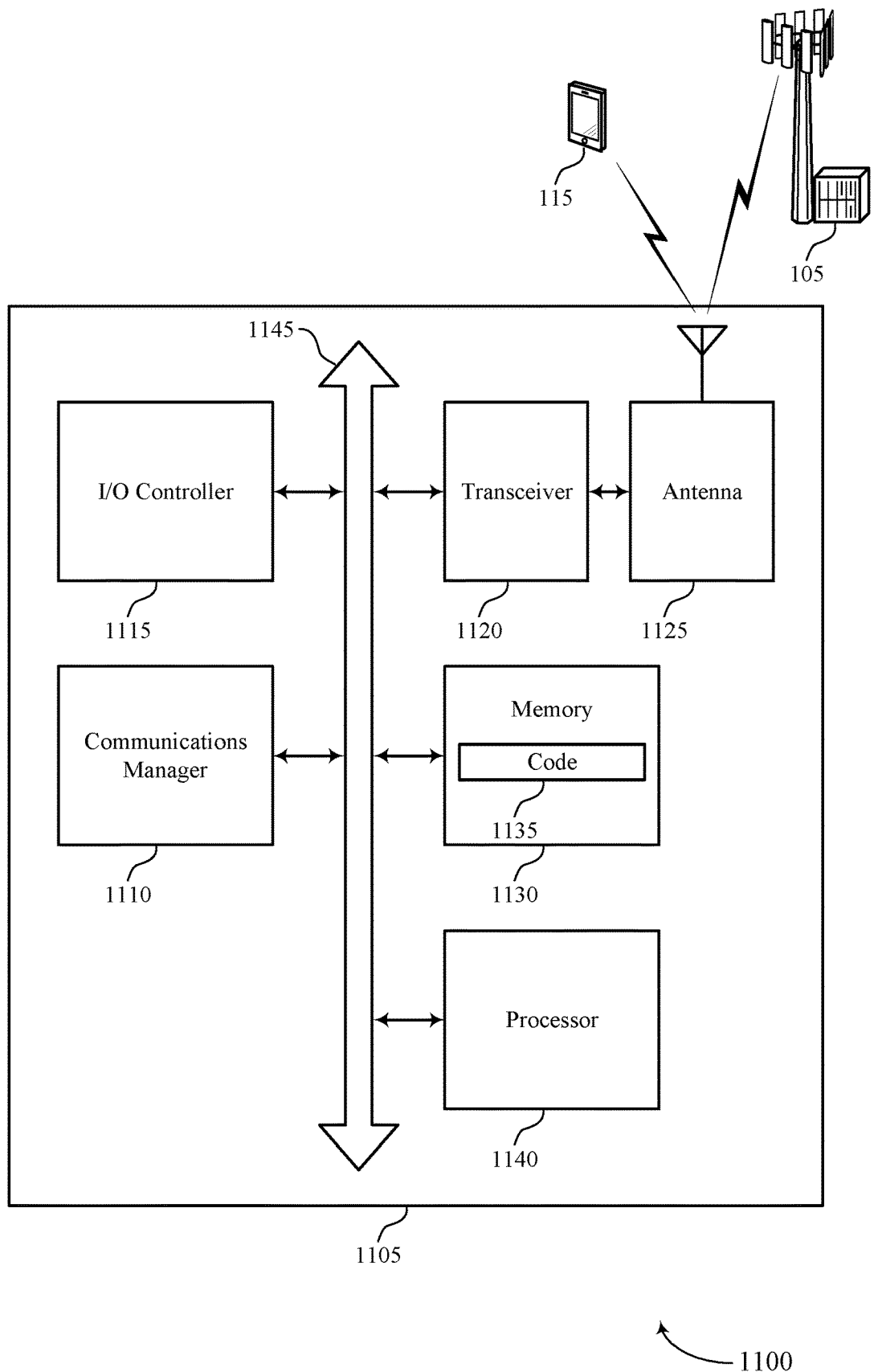
FIG. 11 shows a diagram of a system including a device that supports bandwidth part switching techniques in wireless communications in accordance with aspects of the present disclosure.

FIG. 11 shows a diagram of a system 1100 including a device 1105 that supports bandwidth part switching techniques in wireless communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, wideband communications over a first bandwidth part of a total bandwidth available for communications between the base station and the UE, identify a last slot of the wideband communications based on an end of burst indicator provided with control information from the base station, where the last slot of the wideband communications is identified prior to reception of the last slot of the wideband communications, and switch, based on the identifying, from the first bandwidth part to a second bandwidth part subsequent to the last slot of the wideband communications, where the second bandwidth part spans a narrower portion of the total bandwidth than the first bandwidth part.

The communications manager 1110 may as described herein be implemented to realize one or more potential advantages. One implementation may allow the device 1105 to perform BWP switching and conserve power for communications of periodic wideband bursts (e.g., for communications of XR frames), which may enhance UE operation and efficiency. Further, implementations may allow the device 1105 to reduce processing overhead between wideband communications bursts, which may reduce heat generation of the UE and reduce the likelihood of throttling based on thermal limits at the UE, which may increase communications reliability, throughput, and enhance user experience, while reducing overall power consumption, among other advantages.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting bandwidth part switching techniques in wireless communications).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
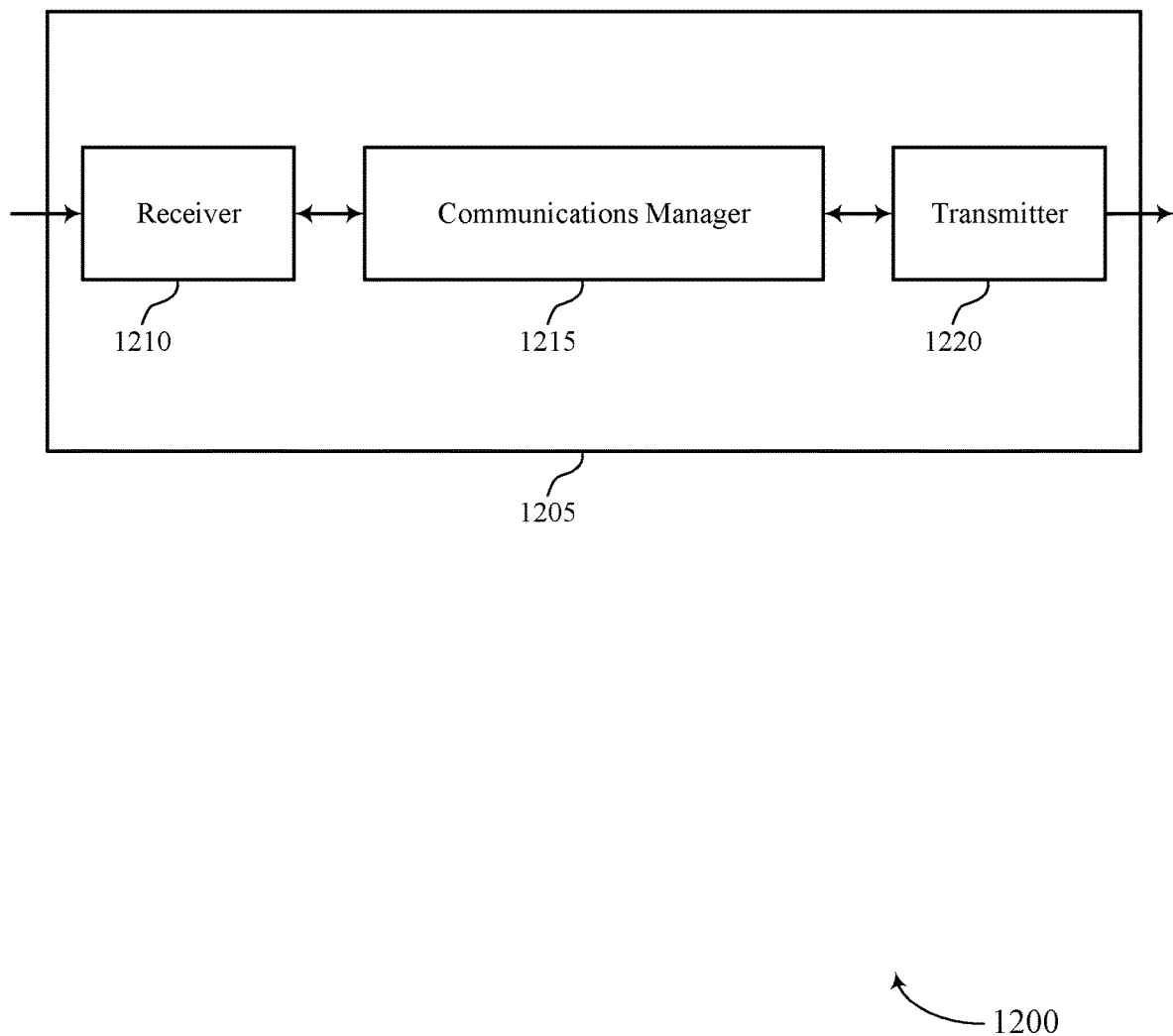
FIGS. 12 and 13 show block diagrams of devices that support bandwidth part switching techniques in wireless communications in accordance with aspects of the present disclosure.

FIG. 12 shows a block diagram 1200 of a device 1205 that supports bandwidth part switching techniques in wireless communications in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to bandwidth part switching techniques in wireless communications). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, wideband communications over a first bandwidth part of a total bandwidth available for communications between the base station and the UE, transmit an end of burst indicator to the UE that identifies a last slot of the wideband communications, where the end of burst indicator is provided prior to transmission of the last slot of the wideband communications, and switch, based on the end of burst indicator, UE communications from the first bandwidth part to a second bandwidth part subsequent to the last slot of the wideband communications, where the second bandwidth part spans a narrower portion of the total bandwidth than the first bandwidth part. The communications manager 1215 may be an example of aspects of the communications manager 1510 described herein.

The communications manager 1215, or its sub-components, may be implemented in hardware, code (e.g., software) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
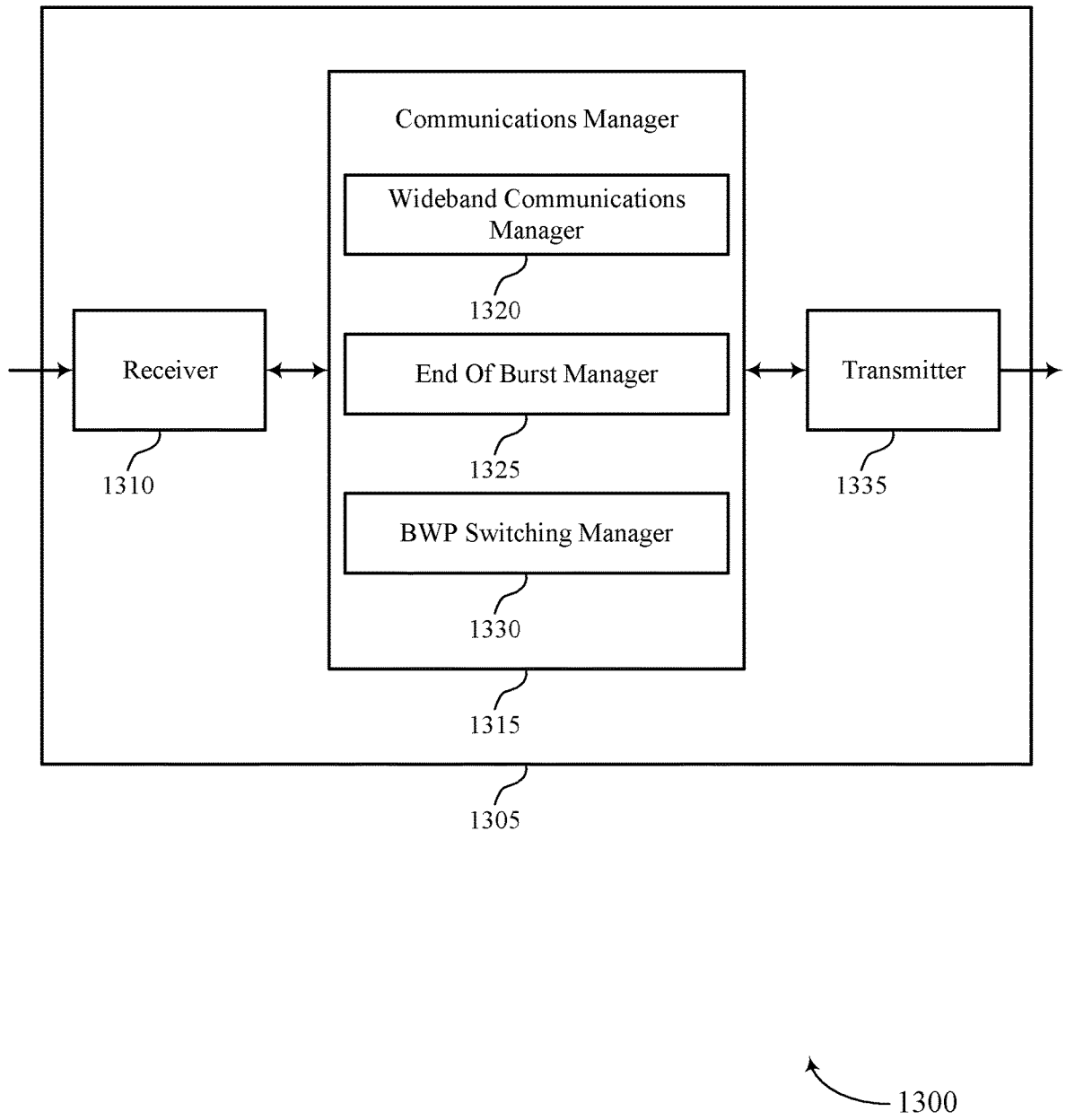

FIG. 13 shows a block diagram 1300 of a device 1305 that supports bandwidth part switching techniques in wireless communications in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to bandwidth part switching techniques in wireless communications). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a wideband communications manager 1320, an end of burst manager 1325, and a BWP switching manager 1330. The communications manager 1315 may be an example of aspects of the communications manager 1510 described herein.

The wideband communications manager 1320 may transmit, to a UE, wideband communications over a first bandwidth part of a total bandwidth available for communications between the base station and the UE.

The end of burst manager 1325 may transmit an end of burst indicator to the UE that identifies a last slot of the wideband communications, where the end of burst indicator is provided prior to transmission of the last slot of the wideband communications.

The BWP switching manager 1330 may switch, based on the end of burst indicator, UE communications from the first bandwidth part to a second bandwidth part subsequent to the last slot of the wideband communications, where the second bandwidth part spans a narrower portion of the total bandwidth than the first bandwidth part.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
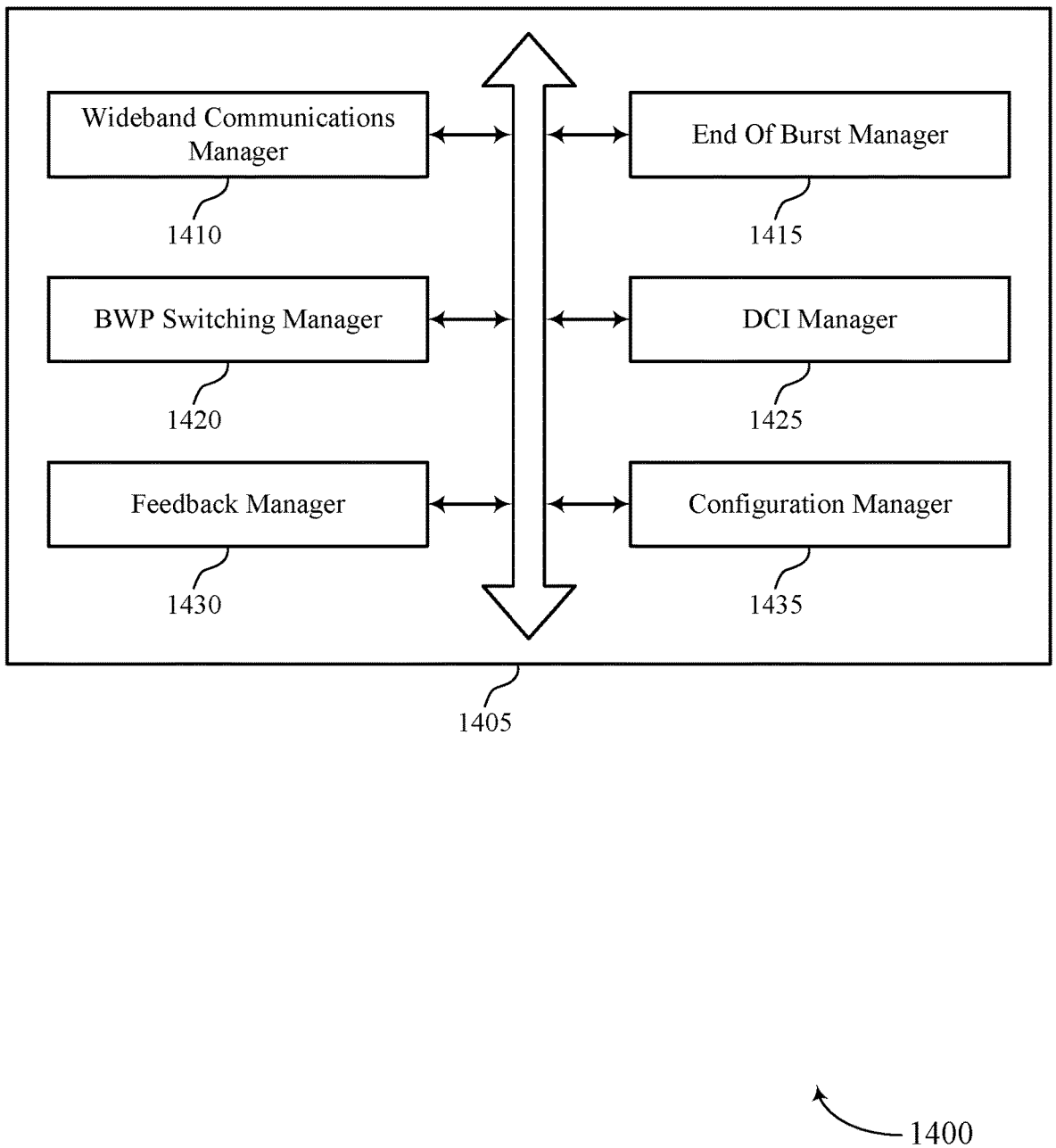
FIG. 14 shows a block diagram of a communications manager that supports bandwidth part switching techniques in wireless communications in accordance with aspects of the present disclosure.

FIG. 14 shows a block diagram 1400 of a communications manager 1405 that supports bandwidth part switching techniques in wireless communications in accordance with aspects of the present disclosure. The communications manager 1405 may be an example of aspects of a communications manager 1215, a communications manager 1315, or a communications manager 1510 described herein. The communications manager 1405 may include a wideband communications manager 1410, an end of burst manager 1415, a BWP switching manager 1420, a DCI manager 1425, a feedback manager 1430, and a configuration manager 1435. Each of these modules may communicate, directly or indirectly, with one another (e.g., via one or more buses).

The wideband communications manager 1410 may transmit, to a UE, wideband communications over a first bandwidth part of a total bandwidth available for communications between the base station and the UE. In some examples, the wideband communications manager 1410 may determine that a retransmission of at least a portion of the wideband communications is to be transmitted to the UE. In some examples, the wideband communications manager 1410 may retransmit at least the portion of the wideband communications over the first bandwidth part.

The end of burst manager 1415 may transmit an end of burst indicator to the UE that identifies a last slot of the wideband communications, where the end of burst indicator is provided prior to transmission of the last slot of the wideband communications. In some examples, the end of burst manager 1415 may transmit, after an initial transmission of the wideband communications, layer-one signaling to the UE that includes the end of burst indicator.

The BWP switching manager 1420 may switch, based on the end of burst indicator, UE communications from the first bandwidth part to a second bandwidth part subsequent to the last slot of the wideband communications, where the second bandwidth part spans a narrower portion of the total bandwidth than the first bandwidth part. In some examples, the BWP switching manager 1420 may transmit, to the UE, the further wideband communications over the third bandwidth part. In some examples, the BWP switching manager 1420 may switch the UE from the first bandwidth part to the second bandwidth part subsequent to the retransmission of at least the portion of the wideband communications.

In some cases, the switching to the second bandwidth part is performed in a next slot following the last slot of the wideband communications. In some cases, a time for the switching from the first bandwidth part to the second bandwidth part is based on one or more of a first time duration between the last slot of the wideband communications and a feedback transmission associated with the wideband communications, a second time duration between the feedback transmission and one or more retransmissions associated with the feedback transmission, or any combinations thereof. In some cases, the first bandwidth part is maintained at the UE based on one or more of the first time duration or the second time duration being less than a time threshold value. In some cases, the time threshold value is based on a bandwidth part switching time associated with the UE.

The DCI manager 1425 may transmit DCI to the UE. In some cases, the layer-one signaling includes a flag in a scheduling DCI transmission that triggers the switching to the second bandwidth part.

The feedback manager 1430 may receive, using the second bandwidth part, a feedback transmission from the UE that indicates successful or unsuccessful receipt of the wideband communications. In some examples, the feedback manager 1430 may receive, using the first bandwidth part, a feedback transmission from the UE that indicates successful or unsuccessful receipt of the wideband communications, and where the switching to the second bandwidth part is performed after the feedback is received from the UE.

The configuration manager 1435 may configure the UE with a timing for switching from the second bandwidth part to a third bandwidth part to receive further wideband communications from the base station, where the third bandwidth part has a same bandwidth as the first bandwidth part or a different bandwidth than the first bandwidth part.

In some cases, the UE autonomously switches to the third bandwidth part based on one or more of a configured periodicity of wideband communications, an indication in control information, or any combinations thereof. In some cases, the configured periodicity of wideband communications provides bandwidth part switching times and is provided by one or more of RRC signaling that indicates a periodicity and an offset for bandwidth part switching, a DRX On-duration start time, information provided with the end of burst indicator, or any combinations thereof.

Figure 15:
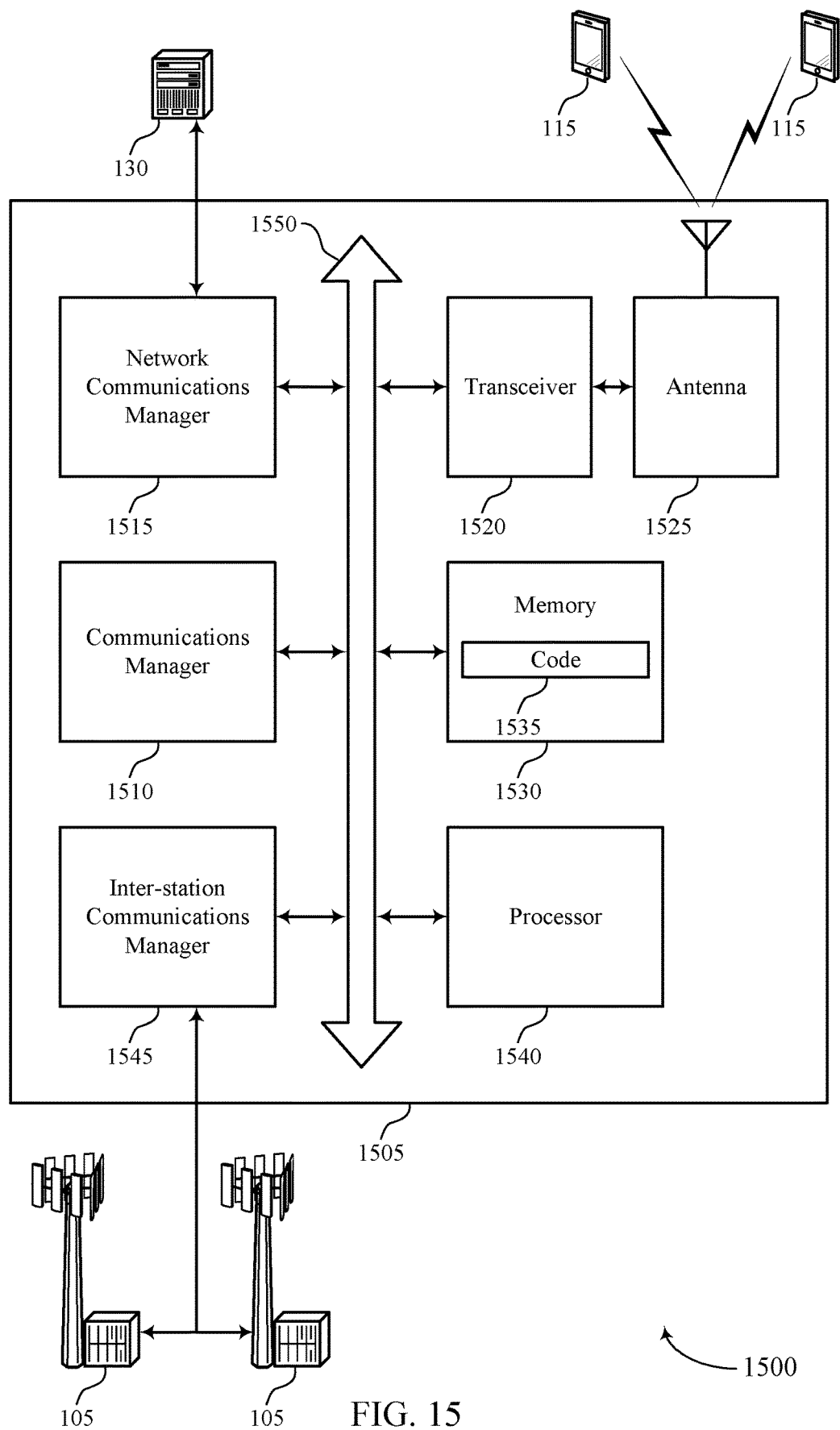
FIG. 15 shows a diagram of a system including a device that supports bandwidth part switching techniques in wireless communications in accordance with aspects of the present disclosure.

FIG. 15 shows a diagram of a system 1500 including a device 1505 that supports bandwidth part switching techniques in wireless communications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, wideband communications over a first bandwidth part of a total bandwidth available for communications between the base station and the UE, transmit an end of burst indicator to the UE that identifies a last slot of the wideband communications, where the end of burst indicator is provided prior to transmission of the last slot of the wideband communications, and switch, based on the end of burst indicator, UE communications from the first bandwidth part to a second bandwidth part subsequent to the last slot of the wideband communications, where the second bandwidth part spans a narrower portion of the total bandwidth than the first bandwidth part.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting bandwidth part switching techniques in wireless communications).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
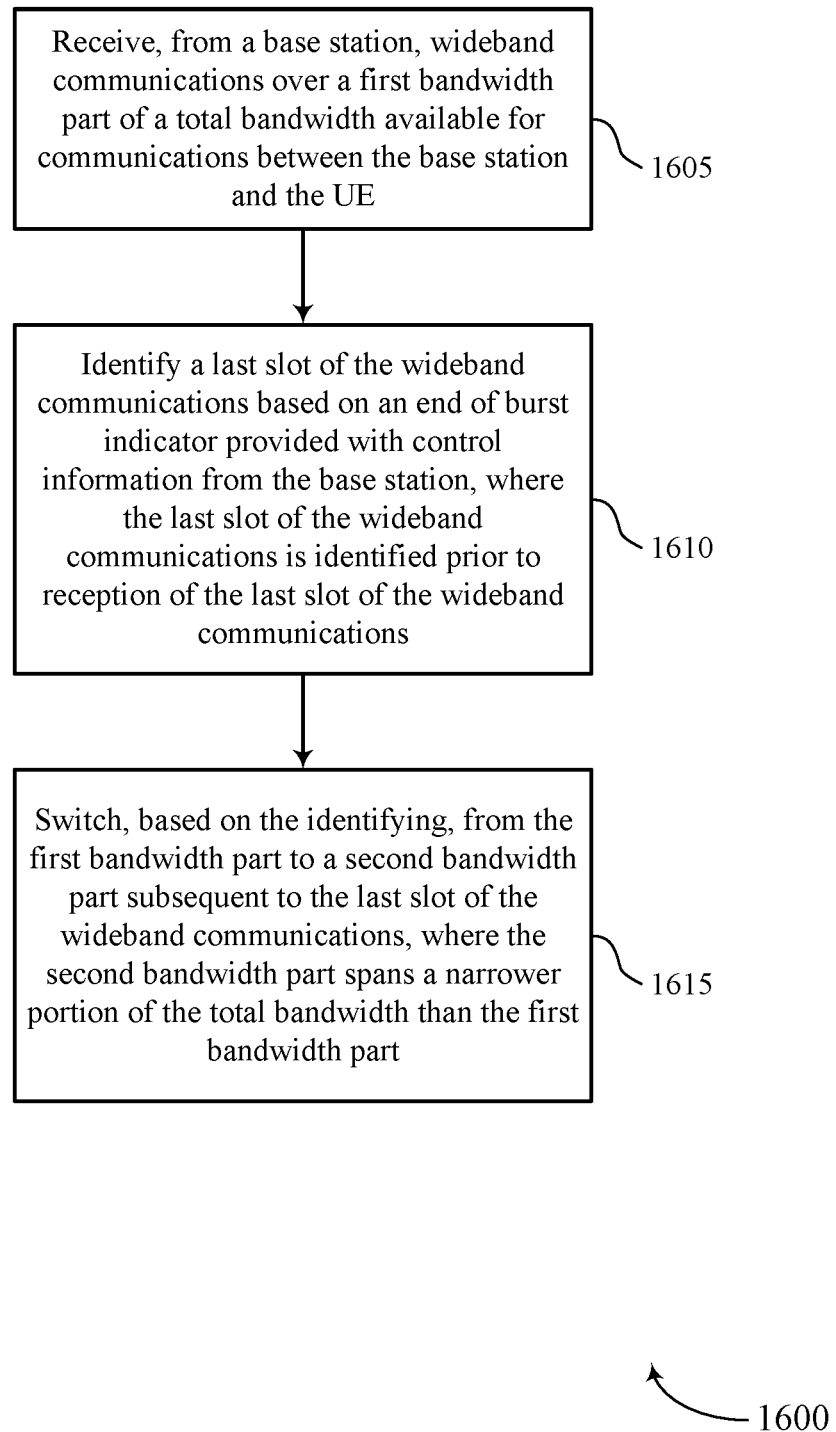
FIGS. 16 through 25 show flowcharts illustrating methods that support bandwidth part switching techniques in wireless communications in accordance with aspects of the present disclosure.

FIG. 16 shows a flowchart illustrating a method 1600 that supports bandwidth part switching techniques in wireless communications in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, wideband communications over a first bandwidth part of a total bandwidth available for communications between the base station and the UE. The operations of 1605 may be performed according to the methods described herein. In some examples, aspects of the operations of 1605 may be performed by a wideband communications manager as described with reference to FIGS. 8 through 11.

At 1610, the UE may identify a last slot of the wideband communications based on an end of burst indicator provided with control information from the base station, where the last slot of the wideband communications is identified prior to reception of the last slot of the wideband communications. The operations of 1610 may be performed according to the methods described herein. In some examples, aspects of the operations of 1610 may be performed by an end of burst manager as described with reference to FIGS. 8 through 11.

At 1615, the UE may switch, based on the identifying, from the first bandwidth part to a second bandwidth part subsequent to the last slot of the wideband communications, where the second bandwidth part spans a narrower portion of the total bandwidth than the first bandwidth part. The operations of 1615 may be performed according to the methods described herein. In some examples, aspects of the operations of 1615 may be performed by a BWP switching manager as described with reference to FIGS. 8 through 11.

Figure 17:
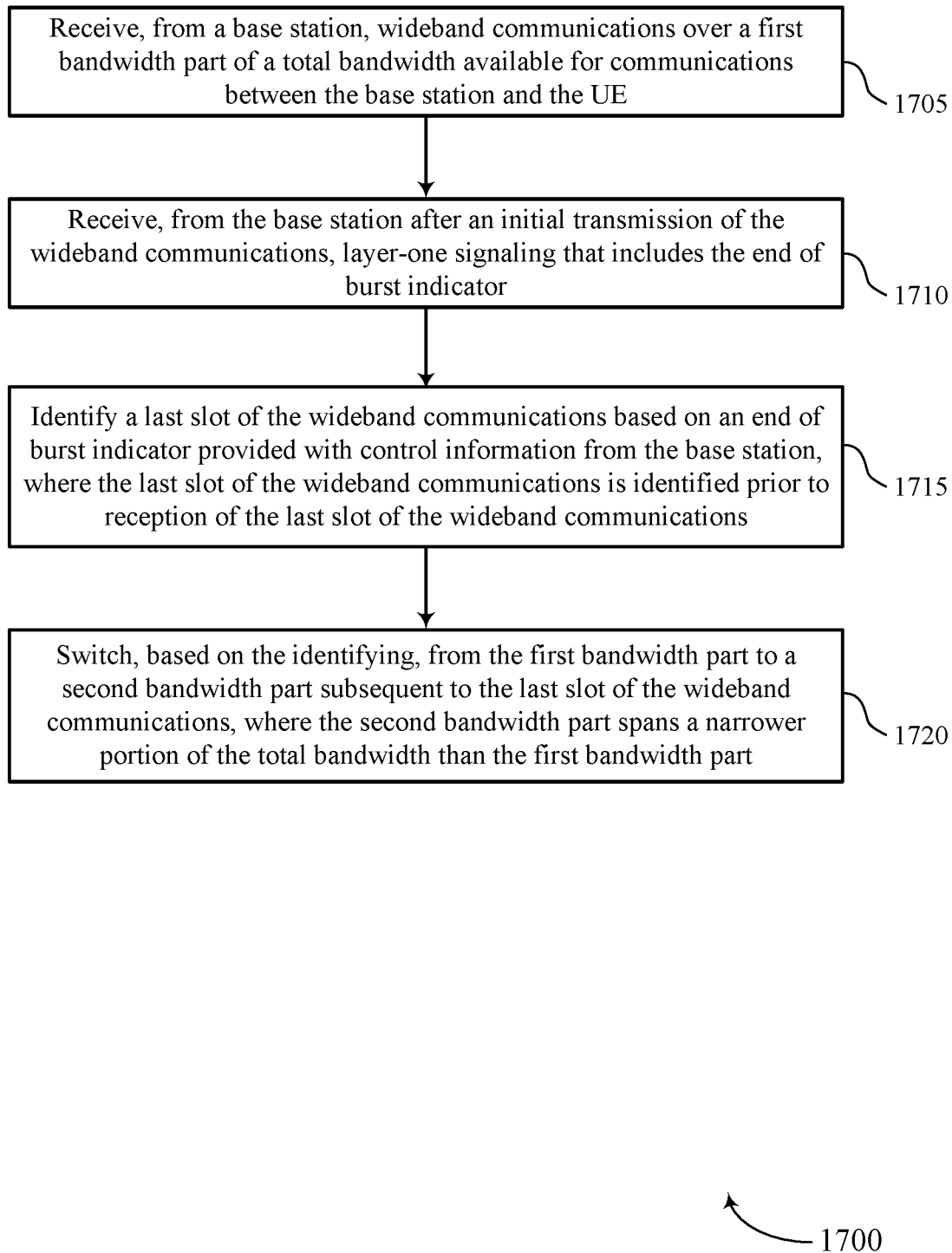

FIG. 17 shows a flowchart illustrating a method 1700 that supports bandwidth part switching techniques in wireless communications in accordance with aspects of the present disclosure. The operations of method 1700 may be implemented by a UE 115 or its components as described herein.

For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, wideband communications over a first bandwidth part of a total bandwidth available for communications between the base station and the UE. The operations of 1705 may be performed according to the methods described herein. In some examples, aspects of the operations of 1705 may be performed by a wideband communications manager as described with reference to FIGS. 8 through 11.

At 1710, the UE may receive, from the base station after an initial transmission of the wideband communications, layer-one signaling that includes the end of burst indicator. The operations of 1710 may be performed according to the methods described herein. In some examples, aspects of the operations of 1710 may be performed by an end of burst manager as described with reference to FIGS. 8 through 11. In some cases, the layer-one signaling may include a flag in a scheduling DCI transmission that triggers the switching to the second bandwidth part.

At 1715, the UE may identify a last slot of the wideband communications based on an end of burst indicator provided with control information from the base station, where the last slot of the wideband communications is identified prior to reception of the last slot of the wideband communications. The operations of 1715 may be performed according to the methods described herein. In some examples, aspects of the operations of 1715 may be performed by an end of burst manager as described with reference to FIGS. 8 through 11.

At 1720, the UE may switch, based on the identifying, from the first bandwidth part to a second bandwidth part subsequent to the last slot of the wideband communications, where the second bandwidth part spans a narrower portion of the total bandwidth than the first bandwidth part. The operations of 1720 may be performed according to the methods described herein. In some examples, aspects of the operations of 1720 may be performed by a BWP switching manager as described with reference to FIGS. 8 through 11.

Figure 18:
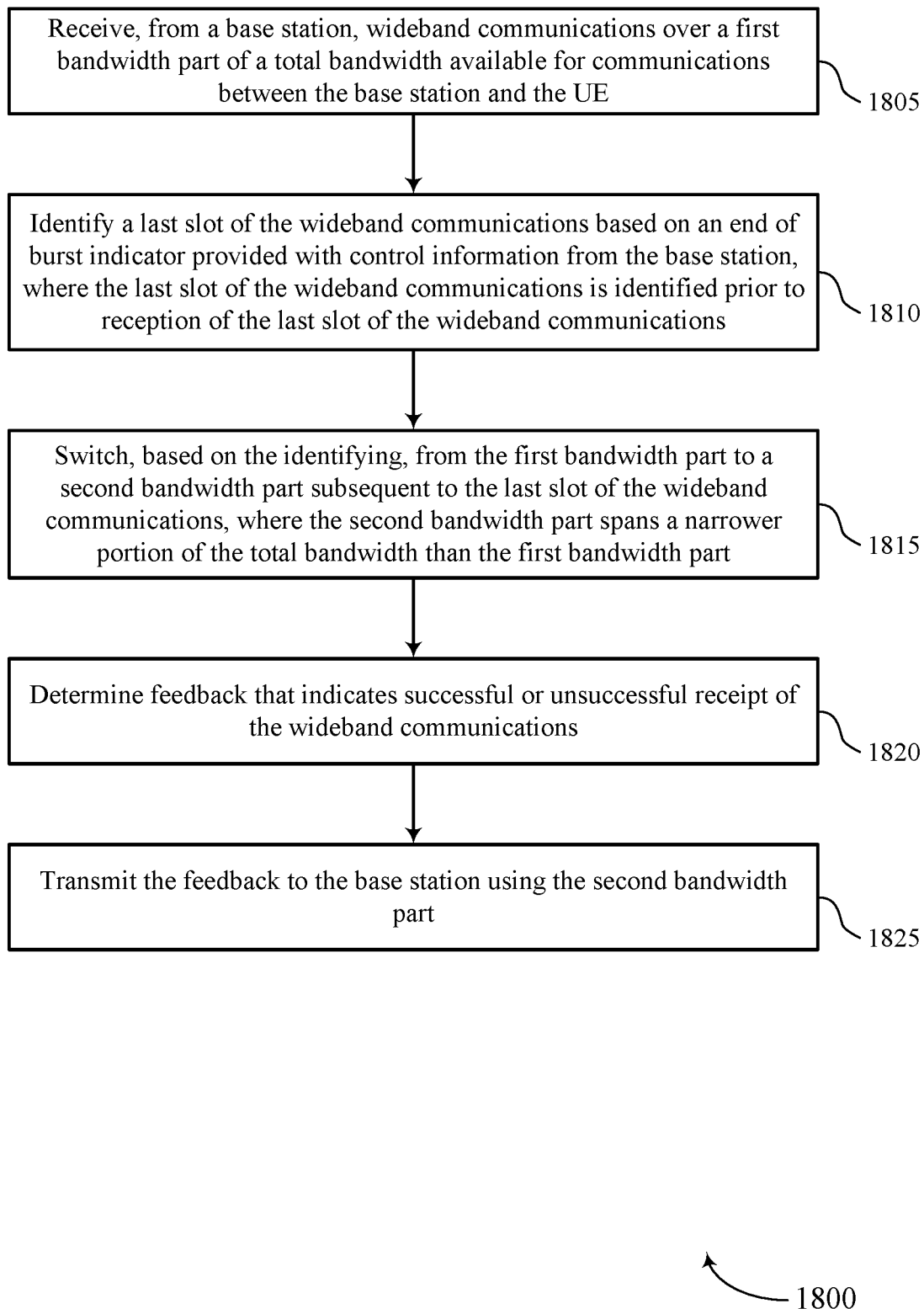

FIG. 18 shows a flowchart illustrating a method 1800 that supports bandwidth part switching techniques in wireless communications in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, wideband communications over a first bandwidth part of a total bandwidth available for communications between the base station and the UE. The operations of 1805 may be performed according to the methods described herein. In some examples, aspects of the operations of 1805 may be performed by a wideband communications manager as described with reference to FIGS. 8 through 11.

At 1810, the UE may identify a last slot of the wideband communications based on an end of burst indicator provided with control information from the base station, where the last slot of the wideband communications is identified prior to reception of the last slot of the wideband communications. The operations of 1810 may be performed according to the methods described herein. In some examples, aspects of the operations of 1810 may be performed by an end of burst manager as described with reference to FIGS. 8 through 11.

At 1815, the UE may switch, based on the identifying, from the first bandwidth part to a second bandwidth part subsequent to the last slot of the wideband communications, where the second bandwidth part spans a narrower portion of the total bandwidth than the first bandwidth part. The operations of 1815 may be performed according to the methods described herein. In some examples, aspects of the operations of 1815 may be performed by a BWP switching manager as described with reference to FIGS. 8 through 11.

At 1820, the UE may determine feedback that indicates successful or unsuccessful receipt of the wideband communications. The operations of 1820 may be performed according to the methods described herein. In some examples, aspects of the operations of 1820 may be performed by a feedback manager as described with reference to FIGS. 8 through 11.

At 1825, the UE may transmit the feedback to the base station using the second bandwidth part. The operations of 1825 may be performed according to the methods described herein. In some examples, aspects of the operations of 1825 may be performed by a feedback manager as described with reference to FIGS. 8 through 11. In some cases, the switching to the second bandwidth part may be performed in a next slot following the last slot of the wideband communications, which is prior to a slot used to transmit the feedback.

Figure 19:
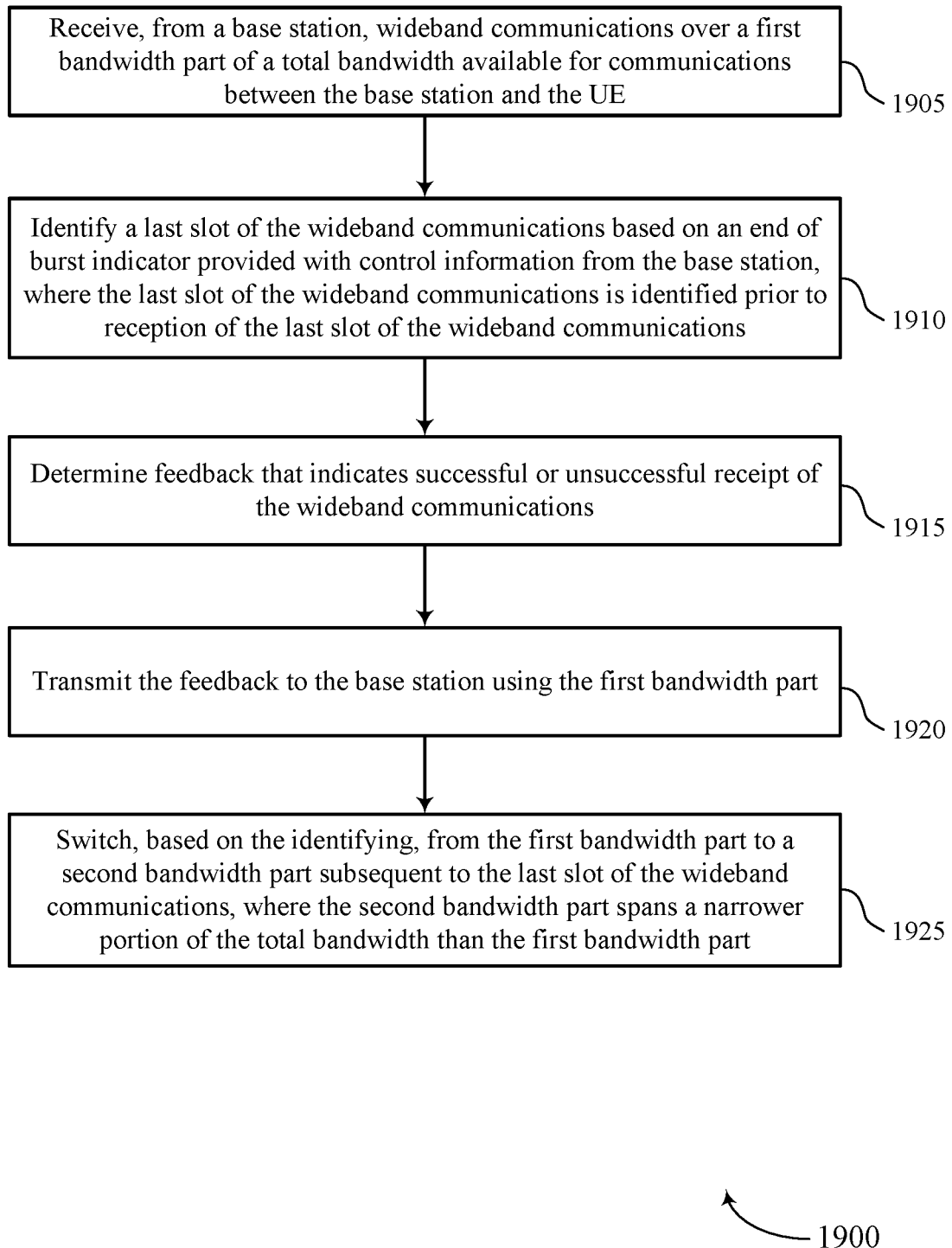

FIG. 19 shows a flowchart illustrating a method 1900 that supports bandwidth part switching techniques in wireless communications in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, wideband communications over a first bandwidth part of a total bandwidth available for communications between the base station and the UE. The operations of 1905 may be performed according to the methods described herein. In some examples, aspects of the operations of 1905 may be performed by a wideband communications manager as described with reference to FIGS. 8 through 11.

At 1910, the UE may identify a last slot of the wideband communications based on an end of burst indicator provided with control information from the base station, where the last slot of the wideband communications is identified prior to reception of the last slot of the wideband communications. The operations of 1910 may be performed according to the methods described herein. In some examples, aspects of the operations of 1910 may be performed by an end of burst manager as described with reference to FIGS. 8 through 11.

At 1915, the UE may determine feedback that indicates successful or unsuccessful receipt of the wideband communications. The operations of 1915 may be performed according to the methods described herein. In some examples, aspects of the operations of 1915 may be performed by a feedback manager as described with reference to FIGS. 8 through 11.

At 1920, the UE may transmit the feedback to the base station using the first bandwidth part. The operations of 1920 may be performed according to the methods described herein. In some examples, aspects of the operations of 1920 may be performed by a feedback manager as described with reference to FIGS. 8 through 11.

At 1925, the UE may switch, based on the identifying, from the first bandwidth part to a second bandwidth part subsequent to the last slot of the wideband communications, and where the switching to the second bandwidth part is performed after the feedback is transmitted to the base station, and where the second bandwidth part spans a narrower portion of the total bandwidth than the first bandwidth part. The operations of 1925 may be performed according to the methods described herein. In some examples, aspects of the operations of 1925 may be performed by a BWP switching manager as described with reference to FIGS. 8 through 11.

Figure 20:
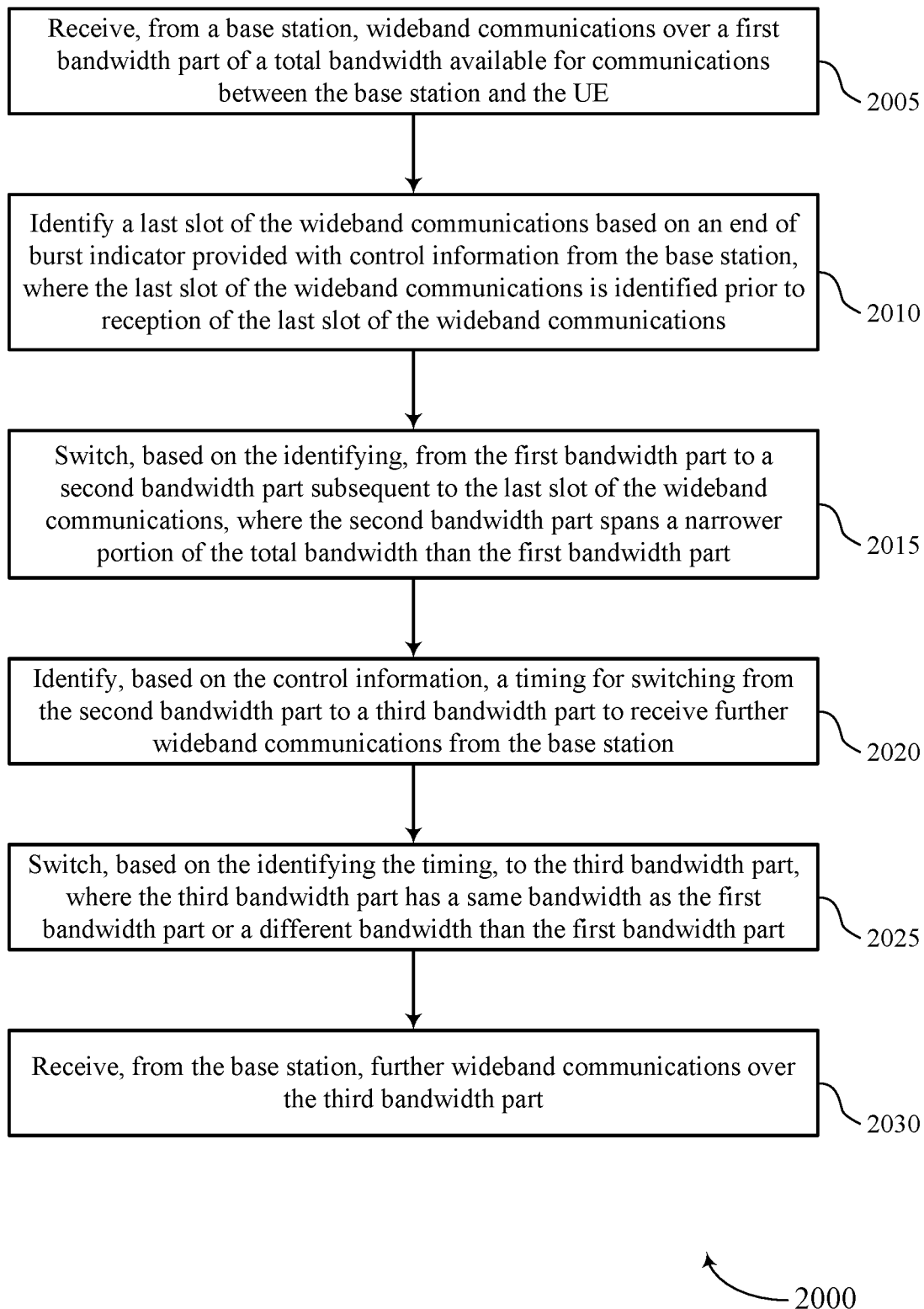

FIG. 20 shows a flowchart illustrating a method 2000 that supports bandwidth part switching techniques in wireless communications in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, wideband communications over a first bandwidth part of a total bandwidth available for communications between the base station and the UE. The operations of 2005 may be performed according to the methods described herein. In some examples, aspects of the operations of 2005 may be performed by a wideband communications manager as described with reference to FIGS. 8 through 11.

At 2010, the UE may identify a last slot of the wideband communications based on an end of burst indicator provided with control information from the base station, where the last slot of the wideband communications is identified prior to reception of the last slot of the wideband communications. The operations of 2010 may be performed according to the methods described herein. In some examples, aspects of the operations of 2010 may be performed by an end of burst manager as described with reference to FIGS. 8 through 11.

At 2015, the UE may switch, based on the identifying, from the first bandwidth part to a second bandwidth part subsequent to the last slot of the wideband communications, where the second bandwidth part spans a narrower portion of the total bandwidth than the first bandwidth part. The operations of 2015 may be performed according to the methods described herein. In some examples, aspects of the operations of 2015 may be performed by a BWP switching manager as described with reference to FIGS. 8 through 11.

At 2020, the UE may identify, based on the control information, a timing for switching from the second bandwidth part to a third bandwidth part to receive further wideband communications from the base station. The operations of 2020 may be performed according to the methods described herein. In some examples, aspects of the operations of 2020 may be performed by a BWP switching manager as described with reference to FIGS. 8 through 11.

At 2025, the UE may switch, based on the identifying the timing, to the third bandwidth part, where the third bandwidth part has a same bandwidth as the first bandwidth part or a different bandwidth than the first bandwidth part. The operations of 2025 may be performed according to the methods described herein. In some examples, aspects of the operations of 2025 may be performed by a BWP switching manager as described with reference to FIGS. 8 through 11.

At 2030, the UE may receive, from the base station, further wideband communications over the third bandwidth part. The operations of 2030 may be performed according to the methods described herein. In some examples, aspects of the operations of 2030 may be performed by a BWP switching manager as described with reference to FIGS. 8 through 11.

Figure 21:
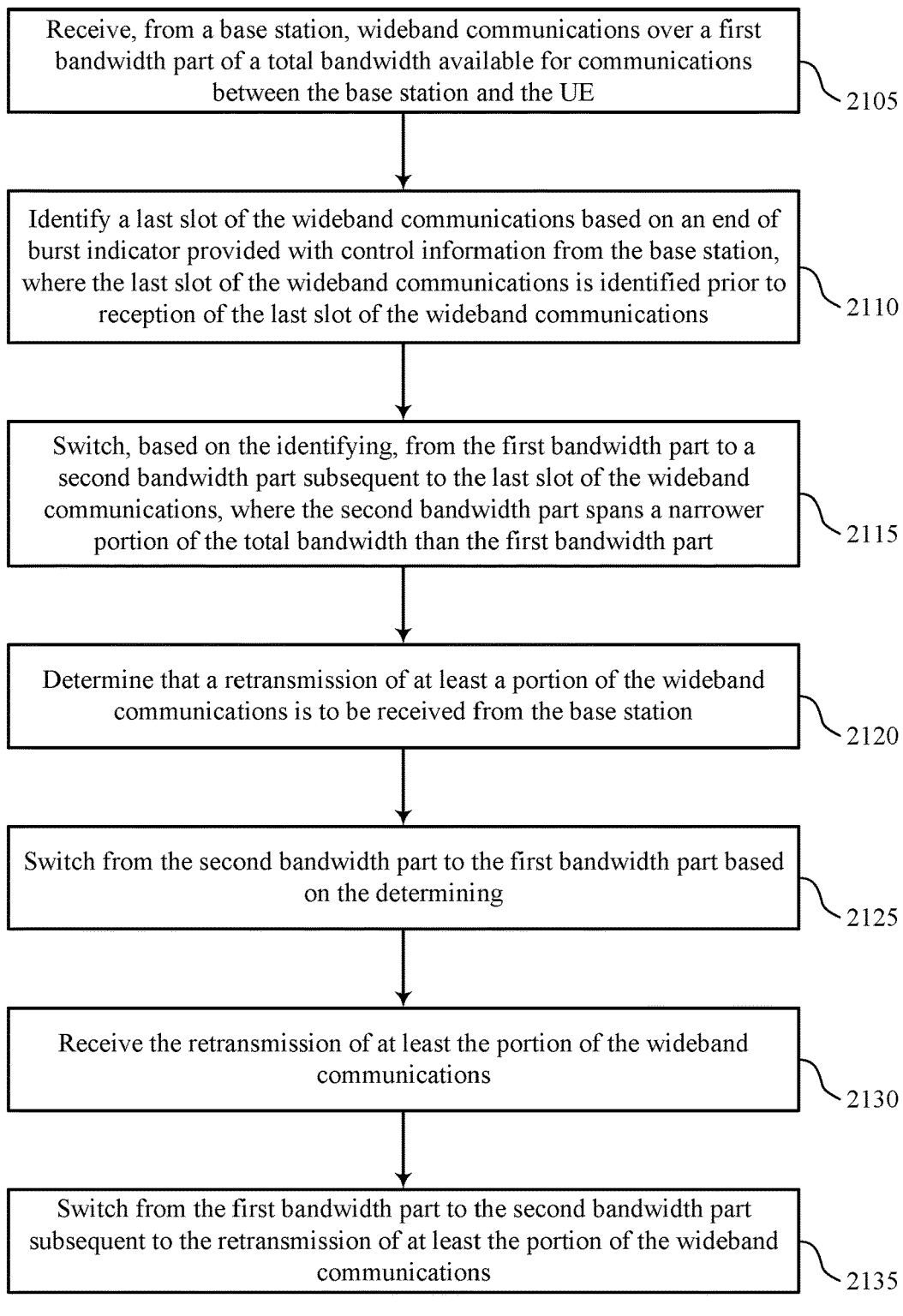

FIG. 21 shows a flowchart illustrating a method 2100 that supports bandwidth part switching techniques in wireless communications in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2105, the UE may receive, from a base station, wideband communications over a first bandwidth part of a total bandwidth available for communications between the base station and the UE. The operations of 2105 may be performed according to the methods described herein. In some examples, aspects of the operations of 2105 may be performed by a wideband communications manager as described with reference to FIGS. 8 through 11.

At 2110, the UE may identify a last slot of the wideband communications based on an end of burst indicator provided with control information from the base station, where the last slot of the wideband communications is identified prior to reception of the last slot of the wideband communications. The operations of 2110 may be performed according to the methods described herein. In some examples, aspects of the operations of 2110 may be performed by an end of burst manager as described with reference to FIGS. 8 through 11.

At 2115, the UE may switch, based on the identifying, from the first bandwidth part to a second bandwidth part subsequent to the last slot of the wideband communications, where the second bandwidth part spans a narrower portion of the total bandwidth than the first bandwidth part. The operations of 2115 may be performed according to the methods described herein. In some examples, aspects of the operations of 2115 may be performed by a BWP switching manager as described with reference to FIGS. 8 through 11.

At 2120, the UE may determine that a retransmission of at least a portion of the wideband communications is to be received from the base station. The operations of 2120 may be performed according to the methods described herein. In some examples, aspects of the operations of 2120 may be performed by a wideband communications manager as described with reference to FIGS. 8 through 11.

At 2125, the UE may switch from the second bandwidth part to the first bandwidth part based on the determining. The operations of 2125 may be performed according to the methods described herein. In some examples, aspects of the operations of 2125 may be performed by a wideband communications manager as described with reference to FIGS. 8 through 11.

At 2130, the UE may receive the retransmission of at least the portion of the wideband communications. The operations of 2130 may be performed according to the methods described herein. In some examples, aspects of the operations of 2130 may be performed by a wideband communications manager as described with reference to FIGS. 8 through 11.

At 2135, the UE may switch from the first bandwidth part to the second bandwidth part subsequent to the retransmission of at least the portion of the wideband communications. The operations of 2135 may be performed according to the methods described herein. In some examples, aspects of the operations of 2135 may be performed by a BWP switching manager as described with reference to FIGS. 8 through 11.

Figure 22:
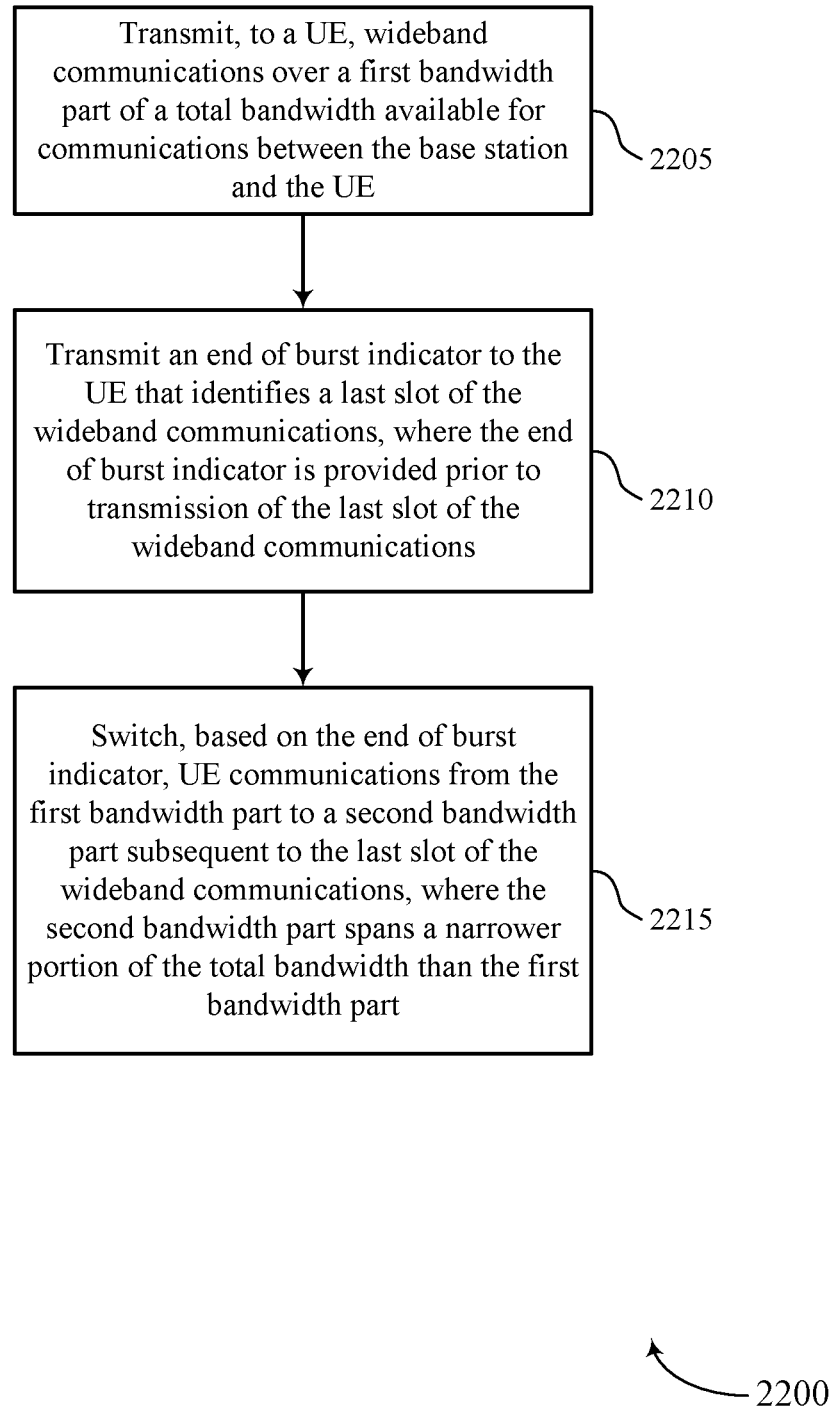

FIG. 22 shows a flowchart illustrating a method 2200 that supports bandwidth part switching techniques in wireless communications in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, wideband communications over a first bandwidth part of a total bandwidth available for communications between the base station and the UE. The operations of 2205 may be performed according to the methods described herein. In some examples, aspects of the operations of 2205 may be performed by a wideband communications manager as described with reference to FIGS. 12 through 15.

At 2210, the base station may transmit an end of burst indicator to the UE that identifies a last slot of the wideband communications, where the end of burst indicator is provided prior to transmission of the last slot of the wideband communications. The operations of 2210 may be performed according to the methods described herein. In some examples, aspects of the operations of 2210 may be performed by an end of burst manager as described with reference to FIGS. 12 through 15.

At 2215, the base station may switch, based on the end of burst indicator, UE communications from the first bandwidth part to a second bandwidth part subsequent to the last slot of the wideband communications, where the second bandwidth part spans a narrower portion of the total bandwidth than the first bandwidth part. The operations of 2215 may be performed according to the methods described herein. In some examples, aspects of the operations of 2215 may be performed by a BWP switching manager as described with reference to FIGS. 12 through 15.

Figure 23:
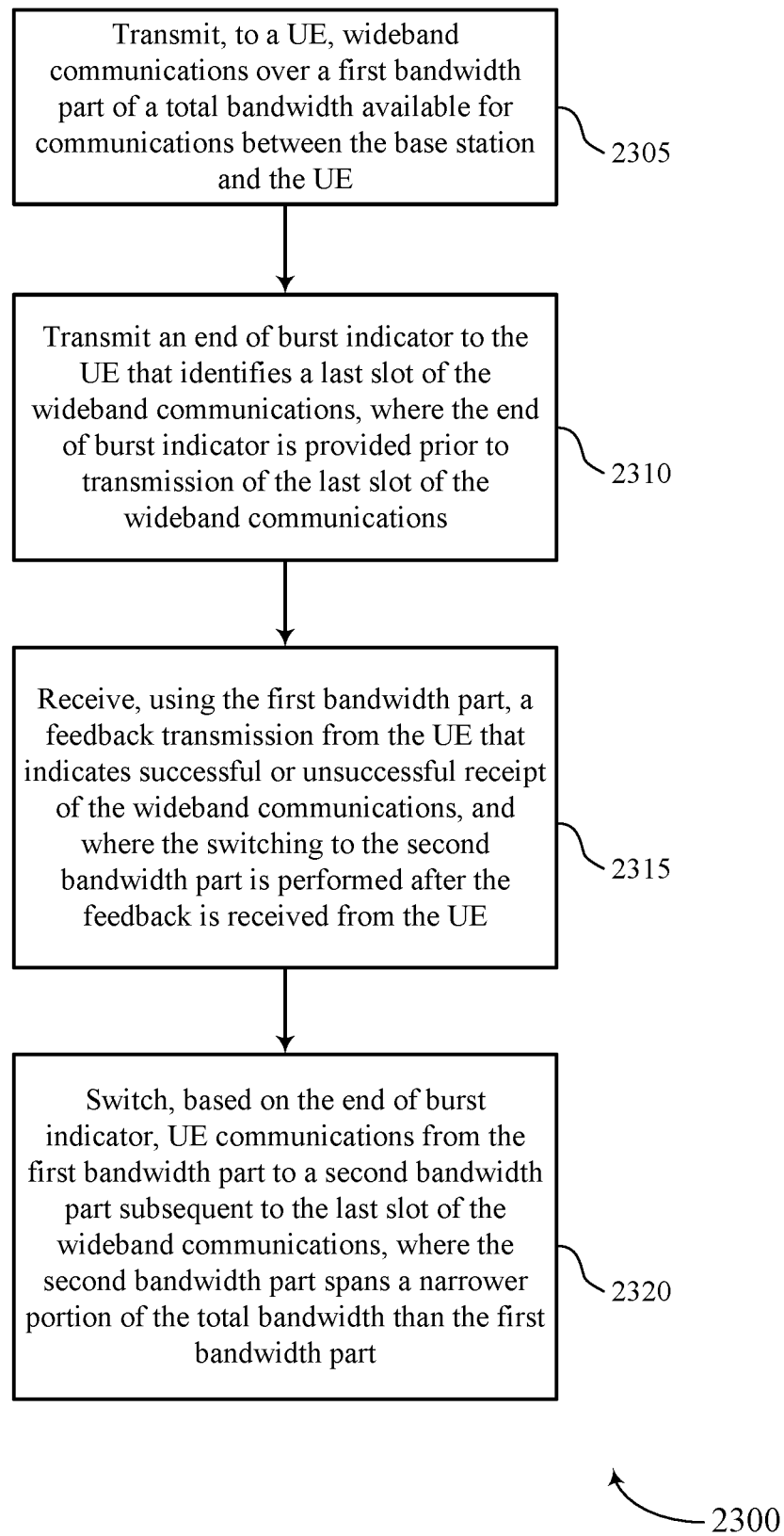

FIG. 23 shows a flowchart illustrating a method 2300 that supports bandwidth part switching techniques in wireless communications in accordance with aspects of the present disclosure. The operations of method 2300 may be implemented by a base station 105 or its components as described herein. For example, the operations of method 2300 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2305, the base station may transmit, to a UE, wideband communications over a first bandwidth part of a total bandwidth available for communications between the base station and the UE. The operations of 2305 may be performed according to the methods described herein. In some examples, aspects of the operations of 2305 may be performed by a wideband communications manager as described with reference to FIGS. 12 through 15.

At 2310, the base station may transmit an end of burst indicator to the UE that identifies a last slot of the wideband communications, where the end of burst indicator is provided prior to transmission of the last slot of the wideband communications. The operations of 2310 may be performed according to the methods described herein. In some examples, aspects of the operations of 2310 may be performed by an end of burst manager as described with reference to FIGS. 12 through 15.

At 2315, the base station may receive, using the first bandwidth part, a feedback transmission from the UE that indicates successful or unsuccessful receipt of the wideband communications, and where the switching to the second bandwidth part is performed after the feedback is received from the UE. The operations of 2315 may be performed according to the methods described herein. In some examples, aspects of the operations of 2315 may be performed by a feedback manager as described with reference to FIGS. 12 through 15.

At 2320, the base station may switch, based on the end of burst indicator, UE communications from the first bandwidth part to a second bandwidth part subsequent to the last slot of the wideband communications, where the second bandwidth part spans a narrower portion of the total bandwidth than the first bandwidth part. The operations of 2320 may be performed according to the methods described herein. In some examples, aspects of the operations of 2320 may be performed by a BWP switching manager as described with reference to FIGS. 12 through 15.

Figure 24:
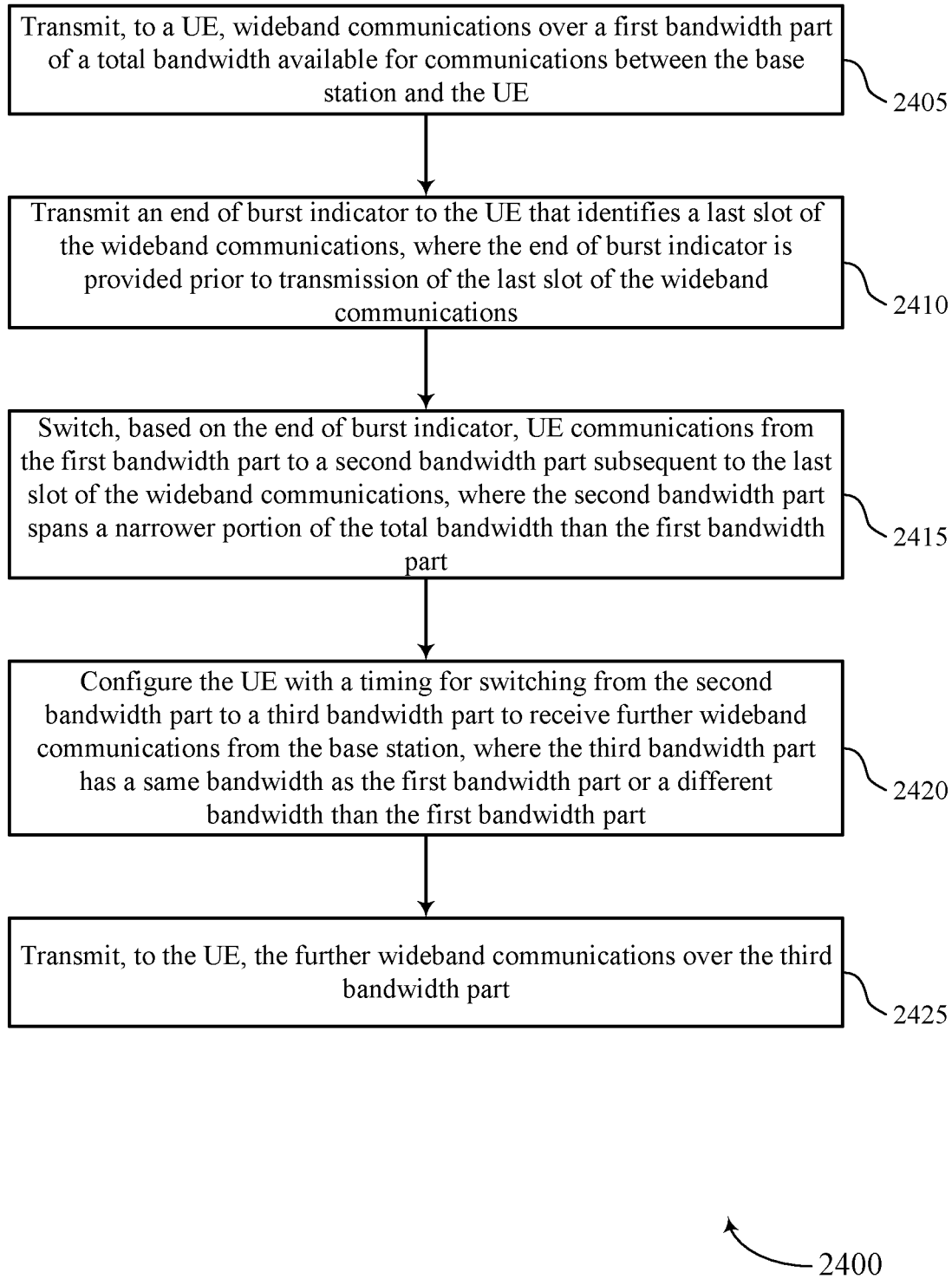

FIG. 24 shows a flowchart illustrating a method 2400 that supports bandwidth part switching techniques in wireless communications in accordance with aspects of the present disclosure. The operations of method 2400 may be implemented by a base station 105 or its components as described herein. For example, the operations of method 2400 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2405, the base station may transmit, to a UE, wideband communications over a first bandwidth part of a total bandwidth available for communications between the base station and the UE. The operations of 2405 may be performed according to the methods described herein. In some examples, aspects of the operations of 2405 may be performed by a wideband communications manager as described with reference to FIGS. 12 through 15.

At 2410, the base station may transmit an end of burst indicator to the UE that identifies a last slot of the wideband communications, where the end of burst indicator is provided prior to transmission of the last slot of the wideband communications. The operations of 2410 may be performed according to the methods described herein. In some examples, aspects of the operations of 2410 may be performed by an end of burst manager as described with reference to FIGS. 12 through 15.

At 2415, the base station may switch, based on the end of burst indicator, UE communications from the first bandwidth part to a second bandwidth part subsequent to the last slot of the wideband communications, where the second bandwidth part spans a narrower portion of the total bandwidth than the first bandwidth part. The operations of 2415 may be performed according to the methods described herein. In some examples, aspects of the operations of 2415 may be performed by a BWP switching manager as described with reference to FIGS. 12 through 15.

At 2420, the base station may configure the UE with a timing for switching from the second bandwidth part to a third bandwidth part to receive further wideband communications from the base station, where the third bandwidth part has a same bandwidth as the first bandwidth part or a different bandwidth than the first bandwidth part. The operations of 2420 may be performed according to the methods described herein. In some examples, aspects of the operations of 2420 may be performed by a configuration manager as described with reference to FIGS. 12 through 15.

At 2425, the base station may transmit, to the UE, the further wideband communications over the third bandwidth part. The operations of 2425 may be performed according to the methods described herein. In some examples, aspects of the operations of 2425 may be performed by a BWP switching manager as described with reference to FIGS. 12 through 15.

Figure 25:
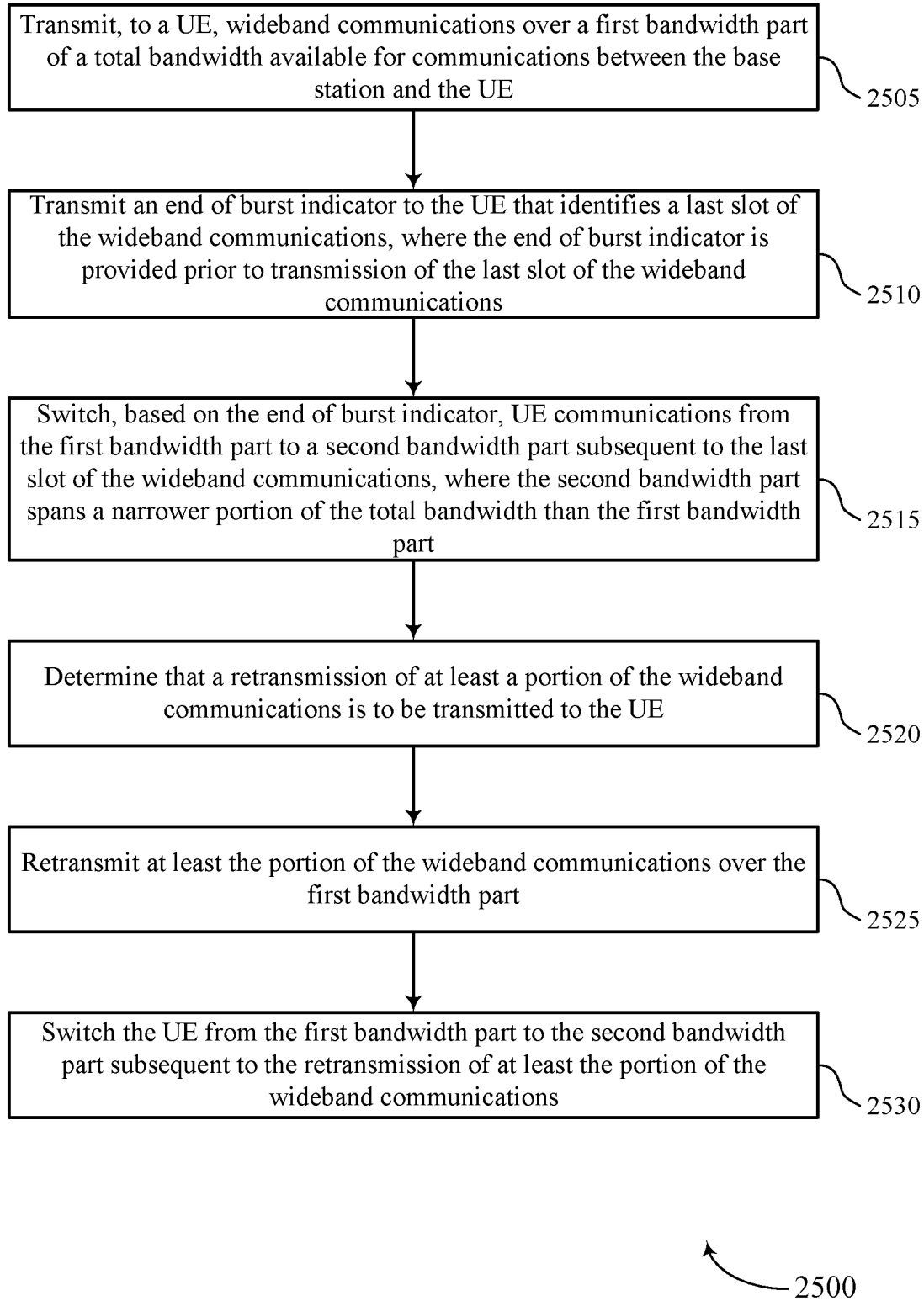

FIG. 25 shows a flowchart illustrating a method 2500 that supports bandwidth part switching techniques in wireless communications in accordance with aspects of the present disclosure. The operations of method 2500 may be implemented by a base station 105 or its components as described herein. For example, the operations of method 2500 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2505, the base station may transmit, to a UE, wideband communications over a first bandwidth part of a total bandwidth available for communications between the base station and the UE. The operations of 2505 may be performed according to the methods described herein. In some examples, aspects of the operations of 2505 may be performed by a wideband communications manager as described with reference to FIGS. 12 through 15.

At 2510, the base station may transmit an end of burst indicator to the UE that identifies a last slot of the wideband communications, where the end of burst indicator is provided prior to transmission of the last slot of the wideband communications. The operations of 2510 may be performed according to the methods described herein. In some examples, aspects of the operations of 2510 may be performed by an end of burst manager as described with reference to FIGS. 12 through 15.

At 2515, the base station may switch, based on the end of burst indicator, UE communications from the first bandwidth part to a second bandwidth part subsequent to the last slot of the wideband communications, where the second bandwidth part spans a narrower portion of the total bandwidth than the first bandwidth part. The operations of 2515 may be performed according to the methods described herein. In some examples, aspects of the operations of 2515 may be performed by a BWP switching manager as described with reference to FIGS. 12 through 15.

At 2520, the base station may determine that a retransmission of at least a portion of the wideband communications is to be transmitted to the UE. The operations of 2520 may be performed according to the methods described herein. In some examples, aspects of the operations of 2520 may be performed by a wideband communications manager as described with reference to FIGS. 12 through 15.

At 2525, the base station may retransmit at least the portion of the wideband communications over the first bandwidth part. The operations of 2525 may be performed according to the methods described herein. In some examples, aspects of the operations of 2525 may be performed by a wideband communications manager as described with reference to FIGS. 12 through 15.

At 2530, the base station may switch the UE from the first bandwidth part to the second bandwidth part subsequent to the retransmission of at least the portion of the wideband communications. The operations of 2530 may be performed according to the methods described herein. In some examples, aspects of the operations of 2530 may be performed by a BWP switching manager as described with reference to FIGS. 12 through 15.

The following provides an overview of aspects of the present disclosure:

Aspect 1: A method for wireless communication at a UE, comprising: receiving, from a base station, wideband communications over a first bandwidth part of a total bandwidth available for communications between the base station and the UE; identifying a last slot of the wideband communications based at least in part on an end of burst indicator provided with control information from the base station, wherein the last slot of the wideband communications is identified prior to reception of the last slot of the wideband communications; and switching, based at least in part on the identifying, from the first bandwidth part to a second bandwidth part subsequent to the last slot of the wideband communications, wherein the second bandwidth part spans a narrower portion of the total bandwidth than the first bandwidth part.

Aspect 2: The method of aspect 1, wherein the identifying comprises: receiving, from the base station after an initial transmission of the wideband communications, layer-one signaling that includes the end of burst indicator.

Aspect 3: The method of aspect 2, wherein the layer-one signaling includes a flag in a scheduling DCI transmission that triggers the switching to the second bandwidth part.

Aspect 4: The method of any of aspects 1 through 3, wherein the switching to the second bandwidth part is performed in a next slot following the last slot of the wideband communications.

Aspect 5: The method of aspect 4, further comprising: determining feedback that indicates successful or unsuccessful receipt of the wideband communications; and transmitting the feedback to the base station using the second bandwidth part.

Aspect 6: The method of any of aspects 1 through 3, further comprising: determining feedback that indicates successful or unsuccessful receipt of the wideband communications; and transmitting the feedback to the base station using the first bandwidth part, and wherein the switching to the second bandwidth part is performed after the feedback is transmitted to the base station.

Aspect 7: The method of any of aspects 1 through 6, further comprising: identifying, based at least in part on the control information, a timing for switching from the second bandwidth part to a third bandwidth part to receive further wideband communications from the base station; switching, based at least in part on the identifying the timing, to the third bandwidth part, wherein the third bandwidth part has a same bandwidth as the first bandwidth part or a different bandwidth than the first bandwidth part; and receiving, from the base station, further wideband communications over the third bandwidth part.

Aspect 8: The method of aspect 7, wherein the UE autonomously switches to the third bandwidth part based at least in part on one or more of a configured periodicity of wideband communications, an indication in the control information, or any combinations thereof.

Aspect 9: The method of aspect 8, wherein the configured periodicity of wideband communications provides bandwidth part switching times and is provided by one or more of RRC signaling that indicates a periodicity and an offset for bandwidth part switching, a DRX On-duration start time, information provided with the end of burst indicator, or any combinations thereof.

Aspect 10: The method of any of aspects 1 through 9, further comprising: determining that a retransmission of at least a portion of the wideband communications is to be received from the base station; switching from the second bandwidth part to the first bandwidth part based at least in part on the determining; receiving the retransmission of at least the portion of the wideband communications; and switching from the first bandwidth part to the second bandwidth part subsequent to the retransmission of at least the portion of the wideband communications.

Aspect 11: The method of any of aspects 1 through 3, wherein a time for the switching from the first bandwidth part to the second bandwidth part is based at least in part on one or more of a first time duration between the last slot of the wideband communications and a feedback transmission associated with the wideband communications, a second time duration between the feedback transmission and one or more retransmissions associated with the feedback transmission, or any combinations thereof.

Aspect 12: The method of aspect 11, wherein the first bandwidth part is maintained at the UE based at least in part on one or more of the first time duration or the second time duration being less than a time threshold value.

Aspect 13: The method of aspect 12, wherein the time threshold value is based at least in part on a bandwidth part switching time associated with the UE.

Aspect 14: A method for wireless communication at a base station, comprising: transmitting, to a UE, wideband communications over a first bandwidth part of a total bandwidth available for communications between the base station and the UE; transmitting an end of burst indicator to the UE that identifies a last slot of the wideband communications, wherein the end of burst indicator is provided prior to transmission of the last slot of the wideband communications; and switching, based at least in part on the end of burst indicator, UE communications from the first bandwidth part to a second bandwidth part subsequent to the last slot of the wideband communications, wherein the second bandwidth part spans a narrower portion of the total bandwidth than the first bandwidth part.

Aspect 15: The method of aspect 14, wherein the transmitting the end of burst indicator comprises: transmitting, after an initial transmission of the wideband communications, layer-one signaling to the UE that includes the end of burst indicator.

Aspect 16: The method of aspect 15, wherein the layer-one signaling includes a flag in a scheduling DCI transmission that triggers the switching to the second bandwidth part.

Aspect 17: The method of any of aspects 14 through 16, wherein the switching to the second bandwidth part is performed in a next slot following the last slot of the wideband communications.

Aspect 18: The method of aspect 17, further comprising: receiving, using the second bandwidth part, a feedback transmission from the UE that indicates successful or unsuccessful receipt of the wideband communications.

Aspect 19: The method of any of aspects 14 through 16, further comprising: receiving, using the first bandwidth part, a feedback transmission from the UE that indicates successful or unsuccessful receipt of the wideband communications, and wherein the switching to the second bandwidth part is performed after the feedback is received from the UE.

Aspect 20: The method of any of aspects 14 through 19, further comprising: configuring the UE with a timing for switching from the second bandwidth part to a third bandwidth part to receive further wideband communications from the base station, wherein the third bandwidth part has a same bandwidth as the first bandwidth part or a different bandwidth than the first bandwidth part; and transmitting, to the UE, the further wideband communications over the third bandwidth part.

Aspect 21: The method of aspect 20, wherein the UE autonomously switches to the third bandwidth part based at least in part on one or more of a configured periodicity of wideband communications, an indication in control information, or any combinations thereof.

Aspect 22: The method of aspect 21, wherein the configured periodicity of wideband communications provides bandwidth part switching times and is provided by one or more of RRC signaling that indicates a periodicity and an offset for bandwidth part switching, a DRX On-duration start time, information provided with the end of burst indicator, or any combinations thereof.

Aspect 23: The method of any of aspects 14 through 16, further comprising: determining that a retransmission of at least a portion of the wideband communications is to be transmitted to the UE; retransmitting at least the portion of the wideband communications over the first bandwidth part; and switching the UE from the first bandwidth part to the second bandwidth part subsequent to the retransmission of at least the portion of the wideband communications.

Aspect 24: An apparatus for wireless communication at a UE, comprising a processor; memory coupled with the processor; and instructions stored in the memory and executable by the processor to cause the apparatus to perform a method of any of aspects 1 through 13.

Aspect 25: An apparatus for wireless communication at a UE, comprising at least one means for performing a method of any of aspects 1 through 13.

Aspect 26: A non-transitory computer-readable medium storing code for wireless communication at a UE, the code comprising instructions executable by a processor to perform a method of any of aspects 1 through 13.

Aspect 27: An apparatus for wireless communication at a base station, comprising a processor; memory coupled with the processor; and instructions stored in the memory and executable by the processor to cause the apparatus to perform a method of any of aspects 14 through 23.

Aspect 28: An apparatus for wireless communication at a base station, comprising at least one means for performing a method of any of aspects 14 through 23.

Aspect 29: A non-transitory computer-readable medium storing code for wireless communication at a base station, the code comprising instructions executable by a processor to perform a method of any of aspects 14 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from a network entity, wideband communications over a first bandwidth part of a total bandwidth available for communications between the network entity and the UE;
identifying a last slot of the wideband communications based at least in part on an end of burst indicator provided with control information from the network entity, wherein the last slot of the wideband communications is identified prior to reception of the last slot of the wideband communications; and
switching, based at least in part on the identifying, from the first bandwidth part to a second bandwidth part subsequent to the last slot of the wideband communications, wherein the second bandwidth part spans a narrower portion of the total bandwidth than the first bandwidth part.

2. The method of claim 1, wherein the identifying comprises:
receiving, from the network entity after an initial transmission of the wideband communications, layer-one signaling that includes the end of burst indicator.

3. The method of claim 2, wherein the layer-one signaling includes a flag in a scheduling downlink control information (DCI) transmission that triggers the switching to the second bandwidth part.

4. The method of claim 1, wherein the switching to the second bandwidth part is performed in a next slot following the last slot of the wideband communications.

5. The method of claim 4, further comprising:
determining feedback that indicates successful or unsuccessful receipt of the wideband communications; and
transmitting the feedback to the network entity using the second bandwidth part.

6. The method of claim 1, further comprising:
determining feedback that indicates successful or unsuccessful receipt of the wideband communications; and
transmitting the feedback to the network entity using the first bandwidth part, and wherein the switching to the second bandwidth part is performed after the feedback is transmitted to the network entity.

7. The method of claim 1, further comprising:
identifying, based at least in part on the control information, a timing for switching from the second bandwidth part to a third bandwidth part to receive further wideband communications from the network entity;
switching, based at least in part on the identifying the timing, to the third bandwidth part, wherein the third bandwidth part has a same bandwidth as the first bandwidth part or a different bandwidth than the first bandwidth part; and
receiving, from the network entity, the further wideband communications over the third bandwidth part.

8. The method of claim 7, wherein the UE autonomously switches to the third bandwidth part based at least in part on one or more of a configured periodicity of wideband communications, an indication in the control information, or any combinations thereof.

9. The method of claim 8, wherein the configured periodicity of wideband communications provides bandwidth part switching times and is provided by one or more of radio resource control (RRC) signaling that indicates a periodicity and an offset for bandwidth part switching, a discontinuous reception (DRX) On-duration start time, information provided with the end of burst indicator, or any combinations thereof.

10. The method of claim 1, further comprising:
determining that a retransmission of at least a portion of the wideband communications is to be received from the network entity;
switching from the second bandwidth part to the first bandwidth part based at least in part on the determining;
receiving the retransmission of at least the portion of the wideband communications; and
switching from the first bandwidth part to the second bandwidth part subsequent to the retransmission of at least the portion of the wideband communications.

11. The method of claim 1, wherein a time for the switching from the first bandwidth part to the second bandwidth part is based at least in part on one or more of a first time duration between the last slot of the wideband communications and a feedback transmission associated with the wideband communications, a second time duration between the feedback transmission and one or more retransmissions associated with the feedback transmission, or any combinations thereof.

12. The method of claim 11, wherein the first bandwidth part is maintained at the UE based at least in part on one or more of the first time duration or the second time duration being less than a time threshold value.

13. The method of claim 12, wherein the time threshold value is based at least in part on a bandwidth part switching time associated with the UE.

14. A method for wireless communication at a network entity, comprising:
transmitting, to a user equipment (UE), wideband communications over a first bandwidth part of a total bandwidth available for communications between the network entity and the UE;
transmitting an end of burst indicator to the UE that identifies a last slot of the wideband communications, wherein the end of burst indicator is provided prior to transmission of the last slot of the wideband communications; and
switching, based at least in part on the end of burst indicator, UE communications from the first bandwidth part to a second bandwidth part subsequent to the last slot of the wideband communications, wherein the second bandwidth part spans a narrower portion of the total bandwidth than the first bandwidth part.

15. The method of claim 14, wherein the transmitting the end of burst indicator comprises:

transmitting, after an initial transmission of the wideband communications, layer-one signaling to the UE that includes the end of burst indicator.

16. The method of claim 15, wherein the layer-one signaling includes a flag in a scheduling downlink control information (DCI) transmission that triggers the switching to the second bandwidth part.

17. The method of claim 14, wherein the switching to the second bandwidth part is performed in a next slot following the last slot of the wideband communications.

18. The method of claim 17, further comprising:
receiving, using the second bandwidth part, a feedback transmission from the UE that indicates successful or unsuccessful receipt of the wideband communications.

19. The method of claim 14, further comprising:
receiving, using the first bandwidth part, a feedback transmission from the UE that indicates successful or unsuccessful receipt of the wideband communications, and wherein the switching to the second bandwidth part is performed after the feedback transmission is received from the UE.

20. The method of claim 14, further comprising:
configuring the UE with a timing for switching from the second bandwidth part to a third bandwidth part to receive further wideband communications from the network entity, wherein the third bandwidth part has a same bandwidth as the first bandwidth part or a different bandwidth than the first bandwidth part; and
transmitting, to the UE, the further wideband communications over the third bandwidth part.

21. The method of claim 20, wherein the UE autonomously switches to the third bandwidth part based at least in part on one or more of a configured periodicity of wideband communications, an indication in control information, or any combinations thereof.

22. The method of claim 21, wherein the configured periodicity of wideband communications provides bandwidth part switching times and is provided by one or more of radio resource control (RRC) signaling that indicates a periodicity and an offset for bandwidth part switching, a discontinuous reception (DRX) On-duration start time, information provided with the end of burst indicator, or any combinations thereof.

23. The method of claim 14, further comprising:
determining that a retransmission of at least a portion of the wideband communications is to be transmitted to the UE;
retransmitting at least the portion of the wideband communications over the first bandwidth part; and
switching the UE from the first bandwidth part to the second bandwidth part subsequent to the retransmission of at least the portion of the wideband communications.

24. A user equipment (UE) for wireless communication, comprising:
one or more memories storing processor-executable code; and
one or more processors coupled with the one or more memories and individually or collectively operable to execute the code to cause the UE to:
receive, from a network entity, wideband communications over a first bandwidth part of a total bandwidth available for communications between the network entity and the UE;
identify a last slot of the wideband communications based at least in part on an end of burst indicator provided with control information from the network entity, wherein the last slot of the wideband communications is identified prior to reception of the last slot of the wideband communications; and
switch, based at least in part on the identifying, from the first bandwidth part to a second bandwidth part subsequent to the last slot of the wideband communications, wherein the second bandwidth part spans a narrower portion of the total bandwidth than the first bandwidth part.

25. The UE of claim 24, wherein the processor-executable code is further executable by the one or more processors to cause the UE to:
receive, from the network entity after an initial transmission of the wideband communications, layer-one signaling that includes the end of burst indicator.

26. The UE of claim 25, wherein the layer-one signaling includes a flag in a scheduling downlink control information (DCI) transmission that triggers the switching to the second bandwidth part.

27. The UE of claim 24, wherein the switching to the second bandwidth part is performed in a next slot following the last slot of the wideband communications.

28. A network entity for wireless communication, comprising:
one or more memories storing processor-executable code; and
one or more processors coupled with the one or more memories and individually or collectively operable to execute the code to cause the network entity base station to:
transmit, to a user equipment (UE), wideband communications over a first bandwidth part of a total bandwidth available for communications between the network entity and the UE;
transmit an end of burst indicator to the UE that identifies a last slot of the wideband communications, wherein the end of burst indicator is provided prior to transmission of the last slot of the wideband communications; and
switch, based at least in part on the end of burst indicator, UE communications from the first bandwidth part to a second bandwidth part subsequent to the last slot of the wideband communications, wherein the second bandwidth part spans a narrower portion of the total bandwidth than the first bandwidth part.

29. The network entity of claim 28, wherein the processor-executable code is further executable by the one or more processors to cause the network entity to:
transmit, after an initial transmission of the wideband communications, layer-one signaling to the UE that includes the end of burst indicator.

30. The network entity of claim 28, wherein the switching to the second bandwidth part is performed in a next slot following the last slot of the wideband communications.

* * * * *